United States Patent
Bouazizi et al.

(10) Patent No.: US 11,811,843 B2
(45) Date of Patent: Nov. 7, 2023

(54) SUPPORTING QUALITY OF SERVICE FOR MEDIA COMMUNICATIONS

(71) Applicant: QUALCOMM Incorporated, San Diego, CA (US)

(72) Inventors: Imed Bouazizi, Frisco, TX (US); Thomas Stockhammer, Bergen (DE); Nikolai Konrad Leung, San Francisco, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 17/818,566

(22) Filed: Aug. 9, 2022

(65) Prior Publication Data
US 2023/0064154 A1 Mar. 2, 2023

Related U.S. Application Data

(60) Provisional application No. 63/232,005, filed on Aug. 11, 2021.

(51) Int. Cl.
*H04L 65/80* (2022.01)
*H04L 65/1108* (2022.01)
*H04L 65/1069* (2022.01)

(52) U.S. Cl.
CPC .......... *H04L 65/80* (2013.01); *H04L 65/1069* (2013.01); *H04L 65/1108* (2022.05)

(58) Field of Classification Search
None
See application file for complete search history.

(56) References Cited

U.S. PATENT DOCUMENTS

2016/0174239 A1* 6/2016 Tietsch ................. H04W 72/56
370/329
2022/0103525 A1* 3/2022 Shribman ............. G06F 16/955

OTHER PUBLICATIONS

3GPP TR 21.905: "3rd Generation Partnership Project, Technical Specification Group Services and System Aspects, Vocabulary for 3GPP Specifications (Release 17)", V17.1.0, Dec. 2021, pp. 1-65.
3GPP TR 22.873: "3rd Generation Partnership Project, Technical Specification Group Services and System Aspects, Study on Evolution of IMS Multimedia Telephony Service (Release 18)", V18.0.0, Jun. 2021, pp. 1-18.
3GPP TR 23.701: "3rd Generation Partnership Project, Technical Specification Group Services and System Aspects, Study on Web Real Time Communication (WebRTC) access to IP Multimedia Subsystem (IMS), Stage 2 (Release 12)", V12.0.0, Dec. 2013, pp. 1-59.

(Continued)

*Primary Examiner* — Jeffrey R Swearingen
(74) *Attorney, Agent, or Firm* — Shumaker & Sieffert, P.A

(57) ABSTRACT

A client device (e.g., user equipment or "UE") may be configured to engage in a media communication session, such as a WebRTC session, with another client device. The client devices may separate a quality of service (QoS) specification from a QoS flow definition, to allow for separate interactive connectivity establishment (ICE) negotiation. The QoS specification may cover all segments of a connection for the media communication session. For example, QoS may be requested for a case where a server (e.g., a Traversal Using Relay Network Address Translation (TURN) server) is hosted by a mobile network operator (MNO). The QoS specification and the QoS flow description may be linked.

38 Claims, 12 Drawing Sheets

(56) References Cited

OTHER PUBLICATIONS

3GPP TR 23.706: "3rd Generation Partnership Project, Technical Specification Group Services and System Aspects, Study on Enhancements to Web Real Time Communication (WebRTC) Access to IP Multimedia Subsystem (IMS), Stage 2 (Release 13)", V13.0.0, Sep. 2015, pp. 1-63.
3GPP TR 26.926: "3rd Generation Partnership Project, Technical Specification Group Services and System Aspects, Traffic Models and Quality Evaluation Methods for Media and XR Services in 5G Systems, (Release 18)", V1.3.0, Nov. 2022, pp. 1-56.
3GPP TR 26.928: "3rd Generation Partnership Project, Technical Specification Group Services and System Aspects, Extended Reality (XR) in 5G (Release 17)", V17.0.0, Apr. 2022, 130 pages.
3GPP TR 26.998: "3rd Generation Partnership Project, Technical Specification Group Services and System Aspects, Support of 5G Glass-type Augmented Reality / Mixed Reality (AR/MR) Devices, (Release 17)", 3GPP TR 26.998 V17.1.0, Sep. 2022, pp. 1-118.
3GPP TR 26.998: "3rd Generation Partnership Project, Technical Specification Group Services and System Aspects, Support of 5G Glass-type Augmented Reality / Mixed Reality (AR/MR) Devices, (Release 18)", 3GPP TR 26.998 V18.0.0, Dec. 2022, pp. 1-121.
3GPP TR 38.838: "3rd Generation Partnership Project, Technical Specification Group Radio Access Network, Study on XR (Extended Reality) Evaluations for NR (Release 17)", V17.0.0, Dec. 2021, pp. 1-269.
3GPP TS 22.261: "3rd Generation Partnership Project, Technical Specification Group Services and System Aspects, Service Requirements for the 5G system, Stage 1 (Release 19)", V19.1.0, Dec. 2022, 115 pages.
3GPP TS 26.261: "3rd Generation Partnership Project, Technical Specification Group Services and System Aspects, Terminal Audio Quality Performance Requirements for Immersive Audio Services Release 17", V0.0.1, Apr. 2019, pp. 1-10.
3GPP TS 26.512: "3rd Generation Partnership Project; Technical Specification Group Services and System Aspects; 5G Media Streaming (5GMS); Protocols (Release 16)", 3GPP TS 26.512 V16.4.0 (Sep. 2021), pp. 1-135.
Bay., et al., "SURF: Speeded Up Robust Features" European Conference on Computer Vision, 2006, pp. 404-417.
Chen H., et al., "Understanding the Characteristics of Mobile Augmented Reality Applications", 2018 IEEE International Symposium on Performance Analysis of Systems and Software (ISPASS), Apr. 2018, pp. 128-138.
Daniel W., et al., "Why is Making Good AR Displays So Hard?", LinkedIn Blog, Aug. 7, 2019, pp. 1-38.
Drage K., et al., "Negotiation Data Channels Using the Session Description Protocol (SDP)", Internet Engineering Task Force (IETF), RFC: 8864, Category: Standards Track, Jan. 2021, pp. 1-24.
ETSI GS ARF 003, "Augmented Reality Framework (ARF), AR Framework Architecture", European Telecommunications Standards Institute (ETSI), 650, Route Des Lucioles, F-06921 Sophia-Antipolis, France, V1.1.1, Mar. 2020, pp. 1-50.
ETSI TS 123 501: "5G, System Architecture for the 5G System (5GS)", 3GPP TS 23.501 version 16.6.0 Release 16, Oct. 2020, pp. 1-449.
ETSI TS 124 371: "Universal Mobile Telecommunications System (UMTS), LTE, Web Real-Time Communications (WebRTC) Access to the IP Multimedia (IM) Core Network (CN) subsystem (IMS), Stage 3, Protocol specification", 3GPP TS 24.371 version 15.2.0 Release 15, Jan. 2020, pp. 1-39.
ETSI TS 126 260: "5G, Objective Test Methodologies for the Evaluation of Immersive Audio Systems (3GPP TS 26.260 version 16.0.0 Release 16)", V16.0.0, Aug. 2020, pp. 1-26.
ETSI TS 126 501: "5G, 5G Media Streaming (5GMS), General Description And Architecture (3GPP TS 26.501 version 16.5.0 Release 16)", V16.5.0, Oct. 2020, 74 Pages.
Falmer O., "AR Headsets Landscape", Sep. 10, 2021, 1 pp.

Google: "Google WebRTC Project Update & Stadia Review", YouTube, Retrieved on Mar. 22, 2023, pp. 1-4.
Google: "Use Depth in Your Android App", Google Developers, Last updated: May 20, 2022, pp. 1-10.
Gul S., et al., "Cloud Rendering-Based Volumetric Video Streaming System for Mixed Reality Services", Proceedings of the 11th ACM Multimedia Systems Conference, May 2020, 4 pages.
Gunkel S.N.B., et al., "Virtual Reality Conferencing: Multi-User Immersive VR Experiences on the Web", Proceedings of the 9th ACM Multimedia Systems Conference, Jun. 2018, 4 pages.
International Search Report and Written Opinion—PCT/US2022/074759—ISA/EPO—dated Nov. 18, 2022, 11 pp.
ISO: "Information Technology—Coded Representation of Immersive Media—Part 3: Versatile video coding", ISO/IEC JTC 1/SC 29 /WG 11 N18692, ISO/IEC CD 23090-3, Jul. 12, 2019, 446 Pages.
ISO/IEC JTC 1/SC 2 9/WG11 [23090-2:201x (E) FDIS] "Information Technology—Coded Representation of Immersive Media (MPEG-I)—Part 2: Omnidirectional Media Format", Apr. 26, 2018, 182 pages.
"ITU-T H.265, Series H: Audiovisual and Multimedia Systems, Infrastructure of Audiovisual Services—Coding of Moving Video, High Efficiency Video Coding", The International Telecommunication Union, Apr. 2015, 634 Pages.
ITU-T H.266: "Series H: Audiovisual and Multimedia Systems Infrastructure of Audiovisual Services—Coding of Moving Video", Versatile Video Coding, The International Telecommunication Union, Aug. 2020, 516 pages.
Jesup R., et al., "WebRTC Data Channels", Internet Engineering Task Force (IETF), RFC: 8831, Category: Standards Track, Jan. 2021, pp. 1-14.
Kang S., et al., "Fire in Your Hands: Understanding Thermal Behavior of Smartphones", The 25th Annual International Conference on Mobile Computing and Networking, May 2019, 16 pages.
Lowe D.G., "Distinctive Image Features from Scale-Invariant Key Points," International Journal of Computer Vision, vol. 60, No. 2, Jan. 5, 2004, XP055203065, 28 pages.
Microsoft: "Scene Lighting", Azure, Jun. 8, 2022, pp. 1-3.
Microsoft: "Scene Understanding", Mixed Reality, Sep. 21, 2022, pp. 1-6.
Microsoft: "Color Materials", Azure, Jan. 9, 2023, pp. 1-4.
Microsoft: "Coordinate Systems", Mixed Reality, Jan. 18, 2023, pp. 1-11.
Microsoft: "PBR Materials", Azure, Jan. 9, 2023, pp. 1-9.
Microsoft: "Use Azure Kinect Sensor SDK Image Transformations", Azure, Sep. 21, 2022, pp. 1-6.
MPEG131 Press Release, "MPEG131 Press Release: Point Cloud Compression—WG11 (MPEG) Promotes a Video-based Point Cloud Compression Technology to the FDIS Stage", Multimedia Communication, Jul. 16, 2020, pp. 1-2.
Oscar Falmer: "Mobile AR Features Landscape", Last Update: Sep. 20, 2021, 4 pages.
Rescorla E., "WebRTC Security Architecture", Internet Engineering Task Force (IETF), RFC: 8827, Category: Standards Track, Jan. 2021, pp. 1-35.
Rosenberg J., Interactive Connectivity Establishment (ICE): A Protocol for Network Address Translator (NAT) Traversal for Offer/Answer Protocols, Internet Engineering Task Force (IETF), RFC: 5245, Obsoletes: 4091, 4092, Category: Standards Track, Apr. 2010, pp. 1-117.
Rublee E., et al., "ORB: an Efficient Alternative to SIFT or SURF", International Conference on Computer Vision, Nov. 2011, 9 pages.
Soudarissanane S.D., et al., "Multi-Sensor Capture and Network Processing for Virtual Reality Conferencing", Proceedings of the 10th ACM Multimedia Systems Conference, Jun. 2019, 4 pages.
Takanori C., et al., "Evaluation of Physical Workload Affected by Mass and Center of Mass of Head-Mounted Display", Applied Ergonomics, Apr. 2018, pp. 1-12.
W3C: "WebXR Device API", W3C Candidate Recommendation Draft, Mar. 3, 2023, pp. 1-123.
Wagner D., "Motion to Photon Latency in Mobile AR and VR", DAQRI, Aug. 20, 2018, pp. 1-15.
Yadayoda: "Why Loop Closure is so Important for Global Mapping", Dec. 23, 2020, pp. 1-7.

(56) References Cited

OTHER PUBLICATIONS

Younes G., et al., "Keyframe-Based Monocular SLAM: Design, Survey, and Future Directions", Robotics and Autonomous Systems, vol. 98, Dec. 2017, pp. 1-25.

* cited by examiner

SUPPORTING QUALITY OF SERVICE FOR MEDIA COMMUNICATIONS

This application claims the benefit of U.S. Provisional Application No. 63/232,005, filed Aug. 11, 2021, the entire contents of which are hereby incorporated by reference.

TECHNICAL FIELD

This disclosure relates to transmission of media data via a computer network in real time.

BACKGROUND

Client devices, also referred to as "user equipment" or "UE," may be configured to exchange audio and/or video data with each other over a computer network. The network may include, for example, routers, hubs, bridges, switches, servers, security devices, and the like, for transporting data between the client devices. The client devices may be smartphones, tablets, personal computers, laptops, or the like. The exchange of audio and/or video data between client devices may be performed in real time, e.g., as a voice or video call.

SUMMARY

In general, this disclosure describes techniques for applying quality of service (QoS) to media communications between client devices. For example, QoS may be applied to a Web Real-Time Communication (WebRTC) session between two client devices. The techniques of this disclosure may include separating QoS specifications from QoS flow definitions, which allows for separate interactive connectivity establishment (ICE) negotiation. The QoS specification may cover all segments of a connection for the media communication session. For example, QoS may be requested for a case where a server (e.g., a Traversal Using Relay Network Address Translation (TURN) server) is hosted by a mobile network operator (MNO). The QoS specification and the QoS flow description may be linked.

In one example, a method of applying quality of service to a media communication session includes determining, by a first client device, a list of interactive connectivity establishment (ICE) candidates for a second client device; determining, by the first client device, valid ICE candidates in the list of ICE candidates; for one or more of the valid ICE candidates, sending, by the first client device, data representing quality of service (QoS) flows associated with the one or more of the valid ICE candidates to a server device executing an application function (AF), the AF providing media control for the media communication session; determining, by the first client device, one of the valid ICE candidates and one of the QoS flows associated with the one of the valid ICE candidates; establishing, by the first client device, the media communication session with the second client device using the determined one of the valid ICE candidates; determining, by the first client device, an association between a QoS specification and the one of the QoS flows for the media communication session; and providing data to an application function to apply, by the first client device, QoS to the media communication session according to the QoS specification.

In another example, a first client device for applying quality of service to a media communication session includes a memory configured to store media data; and one or more processors implemented in circuitry and configured to: determine a list of interactive connectivity establishment (ICE) candidates for a second client device; determine valid ICE candidates in the list of ICE candidates; for one or more of the valid ICE candidates, send data representing quality of service (QoS) flows associated with the one or more of the valid ICE candidates to a server device executing an application function (AF), the AF providing media control for the media communication session; determine one of the valid ICE candidates and one of the QoS flows associated with the one of the valid ICE candidates; establish the media communication session with the second client device using the determined one of the valid ICE candidates; determine an association between a QoS specification and the one of the QoS flows for the media communication session; and provide data to the AF to apply QoS to the media communication session according to the QoS specification.

In another example, a computer-readable storage medium has stored thereon instructions that, when executed, cause a processor of a first client device to: determine a list of interactive connectivity establishment (ICE) candidates for a second client device; determine valid ICE candidates in the list of ICE candidates; for one or more of the valid ICE candidates, send data representing quality of service (QoS) flows associated with the one or more of the valid ICE candidates to a server device executing an application function (AF), the AF providing media control for the media communication session; determine one of the valid ICE candidates and one of the QoS flows associated with the one of the valid ICE candidates; establish the media communication session with the second client device using the determined one of the valid ICE candidates; determine an association between a QoS specification and the one of the QoS flows for the media communication session; and provide data to the AF to apply QoS to the media communication session according to the QoS specification.

In another example, first client device for applying quality of service to a media communication session includes means for determining a list of interactive connectivity establishment (ICE) candidates for a second client device; means for determining valid ICE candidates in the list of ICE candidates; means for sending, for one or more of the valid ICE candidates, data representing quality of service (QoS) flows associated with the one or more of the valid ICE candidates to a server device executing an application function (AF), the AF providing media control for the media communication session; means for determining one of the valid ICE candidates and one of the QoS flows associated with the one of the valid ICE candidates; means for establishing the media communication session with the second client device using the determined one of the valid ICE candidates; means for determining an association between a QoS specification and the one of the QoS flows for the media communication session; and means for providing data to the AF to apply QoS to the media communication session according to the QoS specification.

In another example, a method of applying quality of service to a media communication session includes receiving, from a first client device and by a server device executing an application function (AF), data representing quality of service (QoS) flows associated with one or more valid interactive connectivity establishment (ICE) candidates for the first client device, the AF providing media control for a media communication session between the first client device and a second client device; receiving, from the first client device and by the server device, data representing an association between one of the QoS flows and an associated QoS specification; and applying, by the server device, QoS to the media communication session according to the QoS specification corresponding to the one of the QoS flows.

In another example, a server device for applying quality of service to a media communication session includes a memory configured to store associations between quality of service (QoS) flows and one or more valid interactive connectivity establishment (ICE) candidates for a first client device; and one or more processors implemented in circuitry and configured to: execute an application function (AF), the AF providing media control for a media communication session between the first client device and a second client device; receive, from the first client device, data representing the associations between QoS flows and the one or more valid ICE candidates for the first client device; receive, from the first client device, data representing an association between one of the QoS flows and an associated QoS specification; and apply, by the server device, QoS to the media communication session according to the QoS specification corresponding to the one of the QoS flows.

In another example, a computer-readable storage medium has stored thereon instructions that cause a processor of a server device to: executing an application function (AF), the AF providing media control for a media communication session between a first client device and a second client device; receive, from the first client device, data representing quality of service (QoS) flows associated with one or more valid interactive connectivity establishment (ICE) candidates for the first client device; receive, from the first client device, data representing an association between one of the QoS flows and an associated QoS specification; and apply QoS to the media communication session according to the QoS specification corresponding to the one of the QoS flows.

In another example, a server device for applying quality of service to a media communication session includes means for executing an application function (AF), the AF providing media control for a media communication session between a first client device and a second client device; means for receiving, from the first client device, data representing quality of service (QoS) flows associated with one or more valid interactive connectivity establishment (ICE) candidates for the first client device; means for receiving, from the first client device, data representing an association between one of the QoS flows and an associated QoS specification; and means for applying QoS to the media communication session according to the QoS specification corresponding to the one of the QoS flows.

The details of one or more examples are set forth in the accompanying drawings and the description below. Other features, objects, and advantages will be apparent from the description, drawings, and claims.

DETAILED DESCRIPTION

Figure 1:
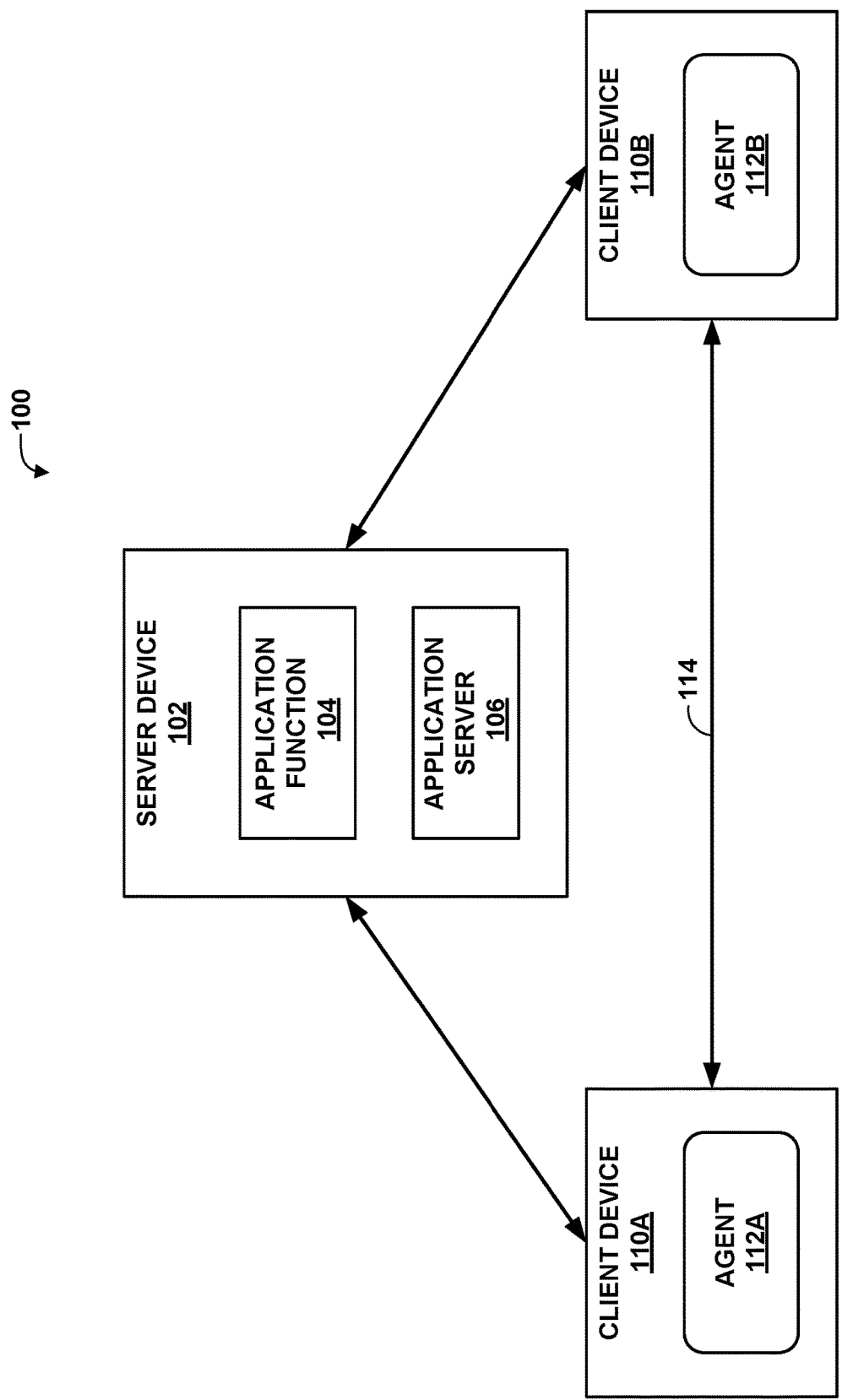
FIG. 1 is a block diagram illustrating an example network in which client devices exchange media data with each other.

FIG. 1 is a block diagram illustrating an example network 100 in which client devices 110A, 110B (client devices 110) exchange media data with each other. In this example, network 100 includes client devices 110 and server device 102. Server device 102 includes application server 106 and executes application function 104. In general, application function 104 provides media control, while application server 106 provides media content traffic, e.g., for communication session 114 between client devices 110.

Client devices 110 include respective agents 112A, 112B (agents 112). Agents 112 may represent Web Real-Time Communication (WebRTC) agents. Agents 112 may include respective WebRTC application programming interfaces (APIs). In general, WebRTC represents an API and a set of protocols for real-time communication, e.g., for communication session 114. For example, client device 110A may use agent 112A to perform communication session 114 with client device 110B via the API and protocols of WebRTC.

Client device 110A may initially generate a request, such as a session description protocol (SDP) offer. For example, client device 110A may call "createOffer" on an RTCPeerConnection object via agent 112A. The SDP offer may include information about agent 112A, e.g., encoder/decoder(s) supported, whether communication session 114 will include audio and/or video, and other connection-related information. In addition, the SDP offer may include a list of one or more interactive connectivity establishment (ICE) candidates, including port and IP pairs that client device 110B can use to establish communication session 114 with client device 110A.

To construct the list of ICE candidates, client device 110A may send one or more requests to a Session Traversal of UDP (STUN) server, e.g., server device 102. The STUN server may provide public port and IP addresses to client device 110A for client device 110A. Client device 110A may then add each port/IP address pair to the list of ICE candidates. After constructing the list of ICE candidates, client device 110A may send the SDP offer to client device 110B via a signaling channel between agents 112A and 112B, e.g., using WebRTC.

After receiving the SDP offer, client device 110B may generate an SDP answer. Client device 110B may gather a list of ICE candidates for itself and generate the SDP answer to include the list of ICE candidates, then send the SDP answer to client device 110A. Client devices 110 may then check the various port/IP address pairs from the lists received from each other and send each pair a STUN request. If a response is received from the other one of client devices 110, the one of client devices 110 that sent the response can determine that the corresponding port and IP pair for the request is a valid ICE candidate.

After client devices 110 finish testing the port/IP pairs, client devices 110 may determine which of the valid pairs to use. Client devices 110 may then exchange media data via the selected, valid pairs.

Additionally, server device 102 may request quality of service (QoS) data from client devices 110A, 110B regarding communication session 114. In accordance with the techniques of this disclosure, server device 102 may submit a QoS request to request QoS reference data after the ICE negotiation between client devices 110. The QoS request may include data that associates QoS flow descriptions with QoS specifications, data that describes a service data flow for which a requested QoS is provided, and data representing a reference to the QoS specification.

After one of client devices 110, e.g., client device 110A, identifies a valid ICE candidate, client device 110A may associate the new QoS flows associated with the ICE candidate and determine whether to update the QoS association with server device 102 (and in particular, application function 104). In response, server device 102 may determine whether to identify the corresponding QoS flows to the remote pair and request that QoS be applied to it as well.

Figure 2:
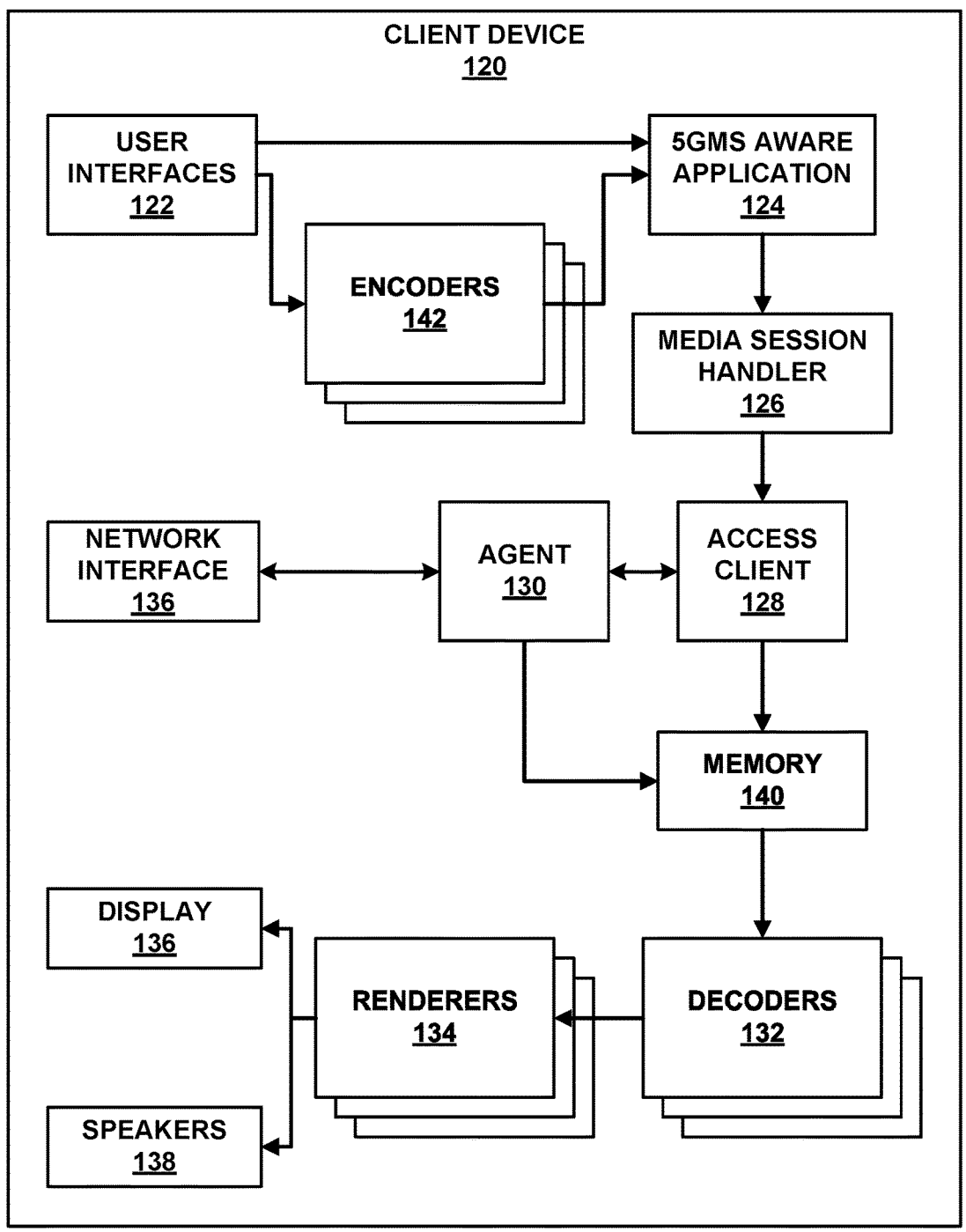
FIG. 2 is a block diagram illustrating an example client device according to techniques of this disclosure.

FIG. 2 is a block diagram illustrating an example client device 120 according to techniques of this disclosure. In this example, client device 120 includes user interfaces 122, 5G Media Streaming (5GMS) aware application 124, media session handler (MSH) 126, access client 128, agent 130, network interface 136, memory 140, decoders 132, renderers 134, display 136, and speakers 138.

User interfaces 122 may represent a variety of user interfaces such as a touchscreen, buttons, joysticks, a microphone, a camera, peripherals such as earbuds, external microphones, external cameras, game controllers, keyboards, mice, or the like. In general, user interfaces 122 allow a user of client device 120 to interact with and provide input to client device 120. For example, the user may use client device 120 to engage in a media communication session with another user of a different client device, such as a Web Real-Time Communication (WebRTC) session. As part of the WebRTC session, the user may send and receive voice data, sound data, video data, still image data, extended reality (XR) data such as augmented reality (AR) data, virtual reality (VR) data, mixed reality (MR) data, or the like.

User interfaces 122 may pass received media data for the media communication session to encoders 142 for encoding. Encoders 142 may include audio, image, video, or other such encoders for encoding media data for network transmission. Encoders 142 may provide the encoded media data to 5GMS aware application 124.

5GMSd aware application 124 may receive user input data from user interfaces 122 and/or encoded media data from encoders 142. 5GMS aware application 124 may pass information representative of the user input data and encoded media data to MSH 126, which may also receive information from a 5GMS application function (AF) executed by a separate server device (not shown in FIG. 2), such as AF 104 of FIG. 1.

MSH 126 may provide the information to access client 128, which may also receive one or more media streams from a 5GMS application server (AS) executed by a separate server device (not shown in FIG. 2), such as AS 106 of FIG. 1.

Access client 128 may initialize a media communication session, such as a WebRTC session, as discussed below. According to the techniques of this disclosure, the media communication session may have an associated quality of service (QoS) configuration. For example, the QoS configuration may depend on whether the media communication session includes audio data, video data, XR data, or a combination thereof, whether accurate user position information is needed, an amount of bandwidth needed for the media communication session, or the like. Access client 128 may receive media data for the media communication session and provide the media data to decoders 132. Media data may also be stored (e.g., buffered) in memory 140. Memory 140 may also store instructions for execution by one or more processors, e.g., software or firmware instructions for any of the various components of client device 120, such as 5GMS aware application 124, MSH 126, access client 128, agent 130, decoders 132, and/or renderers 134.

Agent 130 may correspond to one of agents 112 of FIG. 1. Agent 130 may represent a WebRTC agent that acts as an API and a set of protocols for real-time communication for the media communication session. As discussed above, agent 130 may construct a list of interactive connectivity establishment (ICE) candidates. Agent 130 may send and receive data via network interface 136, which may represent a wireless or wired network interface, such as a WiFi interface, an 802.11 interface, an Ethernet interface, or the like.

Agent 130 may determine a list of ICE candidates for another client device, as well as for itself. For example, agent 130 may query a STUN server to determine its various public IP addresses and ports. Agent 130 may then form the list of ICE candidates to include one or more of the ICE candidates indicated in the data received from the STUN server. Agent 130 may further receive data representing one or more STUN and/or TURN servers prior to querying the STUN and/or TURN servers. In some examples, server device 102 may execute AF 104 to act as both a STUN server and a TURN server.

Agent 130 may use a TURN server to establish a media communication session with another client device. For example, agent 130 of client device 120 may send an invite to the other client device and receive an acceptance in response to the invite. The invite may include the list of ICE candidates for client device 120, and the acceptance may include a list of ICE candidates for the other client device. The other client device may also be referred to as a peer client device.

Agent 130 may then validate each ICE candidate in the list for the other client device. For example, agent 130 may send a STUN request to the IP address and port for a particular ICE candidate for the other client device. If a response is received for the STUN request, agent 130 may determine that the corresponding ICE candidate is valid. After determining the valid ICE candidates, agent 130 may negotiate with the other client device to determine which ICE candidates for each device are to be used for the media communication session.

In accordance with the techniques of this disclosure, agent 130 may specify one or more quality of service (QoS) flows associated with each of the valid ICE candidates to server device 102 (FIG. 1). Thus, server device 102 may use this information to determine an appropriate QoS flow for a particular one of the ICE candidates. In this manner, data to be sent to the other client device as part of the media communication session, i.e., directed to the public IP address and port for the other client device, may be sent via a corresponding QoS flow. In this manner, QoS may be applied to the media communication session.

Decoders 132 may include audio decoders, video decoders, or the like. Decoders 132 may receive media data exchanged via the media communication session and decode the received media data. Decoders 132 may provide the decoded media data to renderers 134, which may render the media data. For example, renderers 134 may compose various pieces of separately decoded media data together for simultaneous playback and provide rendered image or video data to display 136 and rendered audio data to speakers 138.

In this manner, client device 120 represents an example of a first client device for applying quality of service to a media communication session, the first client device including: a memory configured to store media data; and one or more processors implemented in circuitry and configured to: determine a list of interactive connectivity establishment (ICE) candidates for a second client device; determine valid ICE candidates in the list of ICE candidates; for one or more of the valid ICE candidates, send data representing quality of service (QoS) flows associated with the one or more of the valid ICE candidates to a server device executing an application function (AF), the AF providing media control for the media communication session; determine one of the valid ICE candidates and one of the QoS flows associated with the one of the valid ICE candidates; establish the media communication session with the second client device using the determined one of the valid ICE candidates; determine an association between a QoS specification and the one of the QoS flows for the media communication session; and provide data to the AF to apply QoS to the media communication session according to the QoS specification.

Figure 3:
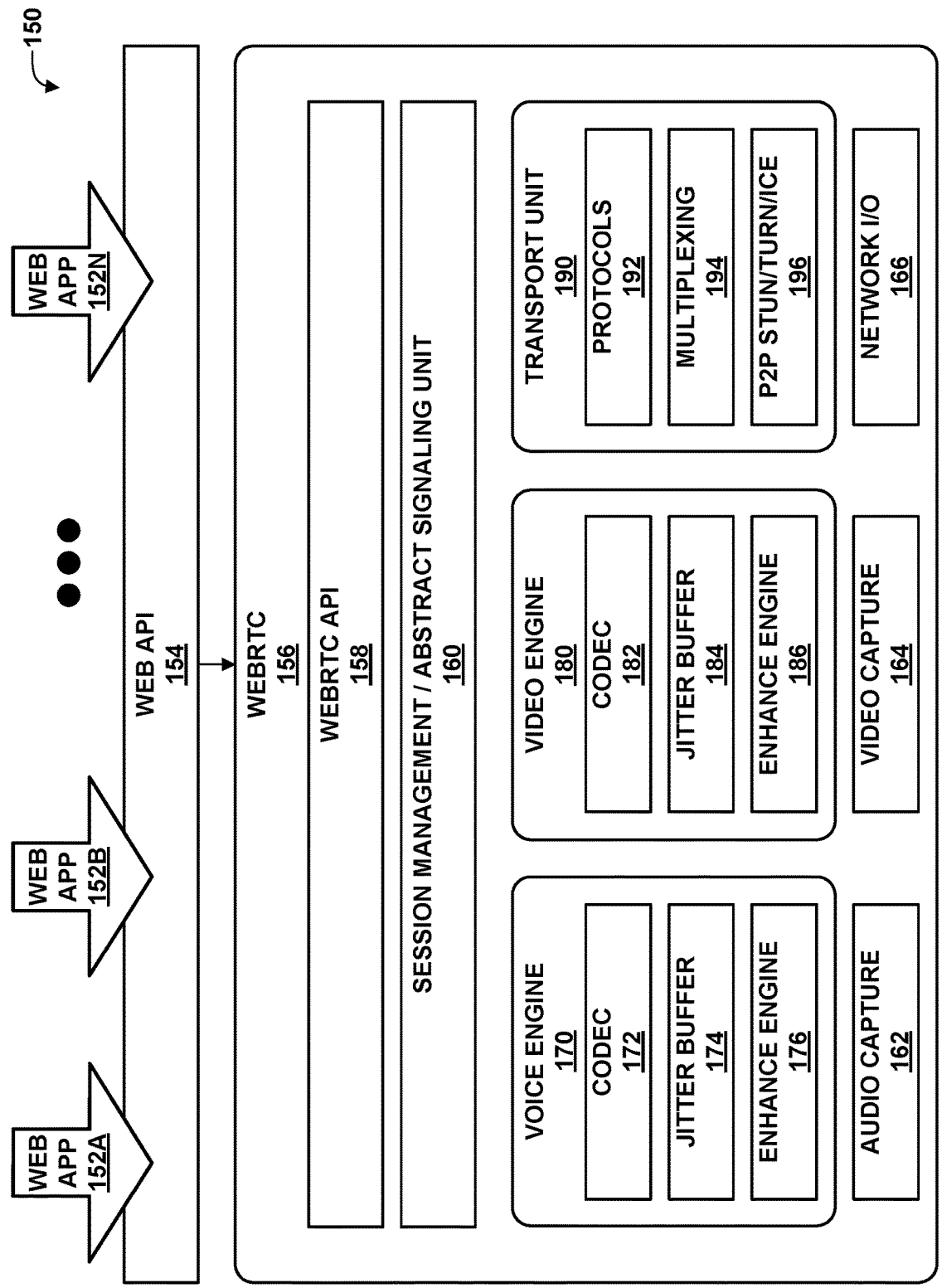
FIG. 3 is a block diagram illustrating an example Web Real-Time Communication (WebRTC) application programming interface (API) architecture.

FIG. 3 is a block diagram illustrating an example Web Real-Time Communication (WebRTC) architecture 156. Agents 112 of FIG. 1 and agent 130 of FIG. 2 may include components similar to those shown in WebRTC architecture 156 of FIG. 3. WebRTC architecture 156 forms part of system 150 for performing WebRTC.

In this example, WebRTC architecture 156 includes WebRTC application programming interface (API) 158 and a set of protocols that enable real-time communication. The WebRTC protocols enable any two WebRTC agents to negotiate and setup a bidirectional and secure real-time communication channel. WebRTC API 156, in one example, exposes a JavaScript-based API to enable the development of applications that make use of existing multimedia capabilities of a client device to establish real-time communication sessions. While JavaScript is one example, access to the WebRTC set of protocols is possible through other programming languages as well.

The RTCWeb group of the Internet Engineering Task Force (IETF) develops and maintains WebRTC protocols. The Worldwide Web Consortium (W3C) develops the WebRTC API.

As shown in FIG. 3, WebRTC API 158 can be decomposed into three layers: a first layer including an API for web developers that includes a MediaStream object, an RTCPeerConnection object, and an RTCDataChannel object; a second layer including an API for a web browser and user agent implementers and providers; and a third layer including an overridable API for audio/video capture and rendering and for network input/output, which the browser implementers can hook implementations to.

In the example of FIG. 3, system 150 includes web application programming interface (API) 154 and WebRTC architecture 156. Web API 154 receives data from one or more web applications 152A-152N (web apps 152). Web API 154 may provide data from web apps 152 to WebRTC architecture 156. WebRTC architecture 156 in this example includes WebRTC API 158, session management and abstract signaling unit 160, voice engine 170, video engine 180, transport unit 190, audio capture 162, video capture 164, and network input/output (I/O) 166.

Voice engine 170 includes encoder/decoder (CODEC) 172, jitter buffer 174, and enhance engine 176. CODEC 172 may include, for example, an Internet speech audio codec (iSAC) and/or an Internet low bitrate codec (iLBC). Jitter buffer 174 may include both a jitter buffer and an error concealment unit. In some examples, jitter buffer 174 may correspond to a NetEQ implementation of a jitter buffer. Enhance engine 176 may include an echo cancelation unit and/or a noise reduction unit.

Video engine 180 includes CODEC 182, jitter buffer 184, and enhance engine 186. CODEC 182 may conform to one or more of a variety of video coding standards, such as ITU-T H.264/Advanced Video Coding (AVC), ITU-T H.265/High Efficiency Video Coding (HEVC), ITU-T H.266/Versatile Video Coding (VVC), VP8, VP9, or the like. Jitter buffer 184 buffers received video data until the video data is ready to be decoded. Enhance engine 186 may enhance decoded video data as a post-loop processing, e.g., with interpolation to upsample images to a higher display resolution, frame-rate upconversion (FRUC), post-loop filtering (e.g., artificial intelligence based filtering), or the like.

Transport unit 190 includes protocols 192, multiplexing unit 194, and peer-to-peer (P2P) STUN/TURN/ICE unit 196. Protocols 192 may include one or more of a variety of transport protocols, such as Real-time Transport Protocol (RTP), Secure RTP (SRTP), or the like. Multiplexing unit 194 may multiplex a variety of streams together, such as one or more audio streams, one or more video streams, and other media (e.g., timed text/closed captions). PTP STUN/TURN/ICE unit 196 generally issues STUN and/or TURN requests as part of ICE negotiation to establish a P2P connection with another client device. P2P STUN/TURN/ICE unit 196 may also perform the techniques of this disclosure, e.g., including QoS flow data with ICE candidates when sending the ICE candidate data to a server device executing an AF, such that the server device can associate the ICE candidate with an appropriate QoS flow.

Audio capture 162 may be a microphone for capturing user voice data or other sound data. Video capture 164 may include one or more cameras for capturing image or video data. Network I/O unit 166 may include one or more network interfaces, such as wired or wireless interfaces, e.g., 802.11 interfaces, WiFi interfaces, Ethernet interfaces, or the like.

Figure 4:
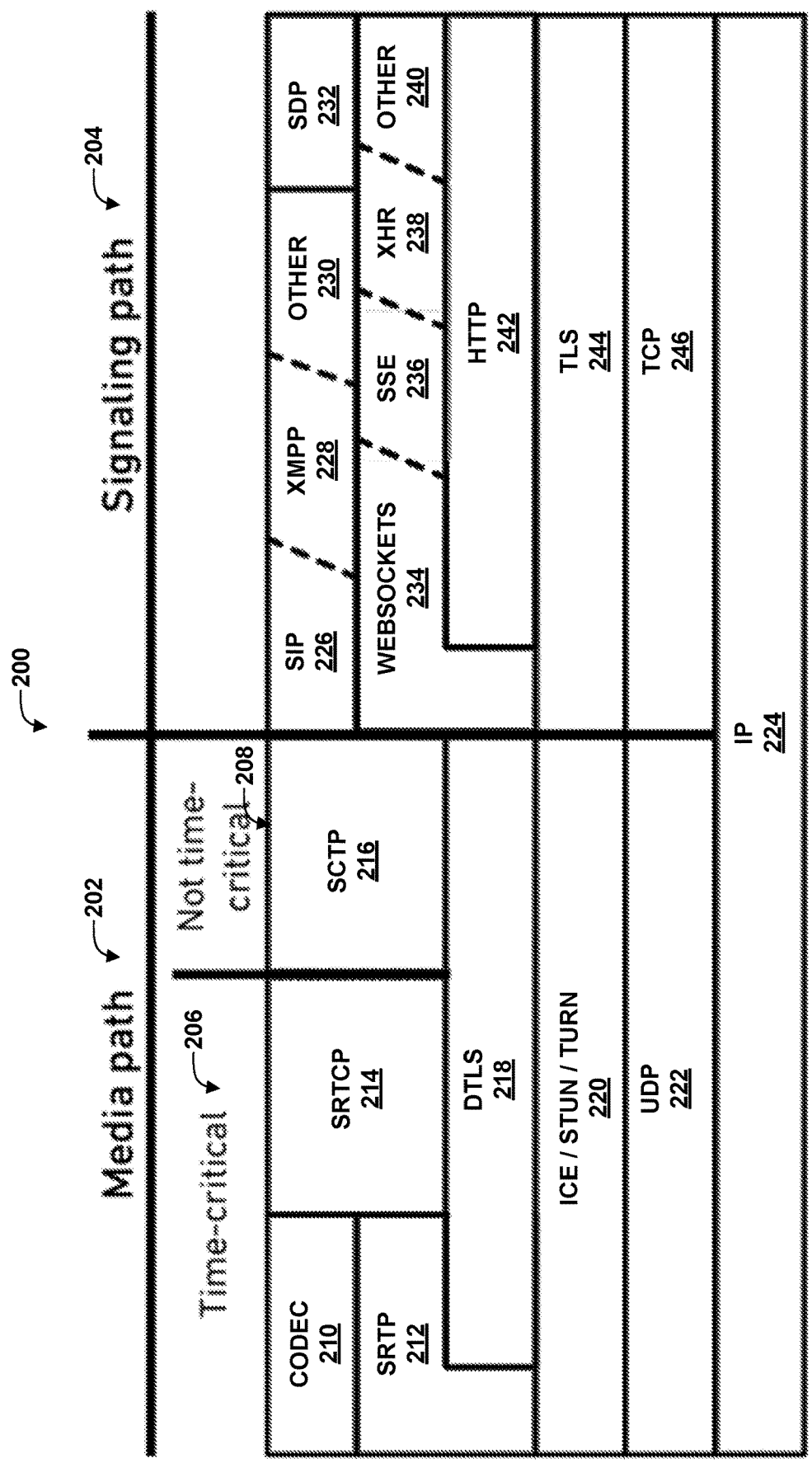
FIG. 4 is a conceptual diagram illustrating an example WebRTC protocol stack.

FIG. 4 is a conceptual diagram illustrating an example WebRTC protocol stack 200. WebRTC stack 200 includes components such as a voice engine, a video engine, and a transport component. The transport component provides a secure transport channel for both parties (e.g., client devices 110 of FIG. 1) to communicate. The transport component may use a Real-time Transport Protocol (RTP) stack that runs over datagram transport layer security (DTLS) and leverages the secure real-time transport protocol (SRTP) profile.

In the example of FIG. 4, WebRTC stack 200 includes media path components 202 and signaling path components 204. Media path components 202 include time-critical components 206 and non-time-critical components 208. Time-critical components include CODEC 210, SRTP 212, and Secure RTP Control Protocol (SRTCP) 214. Non-time-critical components include stream control transmission protocol (SCTP) 216. Datagram transport layer security (DTLS) protocol 218 supports each of the various media path components above DTLS protocol 218 in the protocol stack. Likewise, ICE/STUN/TURN protocols 220 support the various components above ICE/STUN/TURN protocols 220 in the stack. Data for each of media path components 202 may be encapsulated according to user datagram protocol (UDP) 222 and encapsulated and transported according to Internet protocol (IP) 224. IP 224 may be IPv4, IPv6, or other IP-layer protocol.

Signaling path components 204 in this example include session initiation protocol (SIP) 226, short message peer-to-peer (SMPP) protocol 228, session description protocol 232, and other protocols 230. These protocols may use Web Sockets 234, server-sent events (SSE), XML HTTP Request (XHR) 238, and other 240 such services. These various services may operate over hypertext transfer protocol (HTTP) 242. HTTP 242 may operate over transport layer security (TLS) protocol 244 to provide security, e.g., encryption. The TLS-secured HTTP data may be transported according to transmission control protocol (TCP) 246, which may be transferred according to IP 224.

Figure 5:
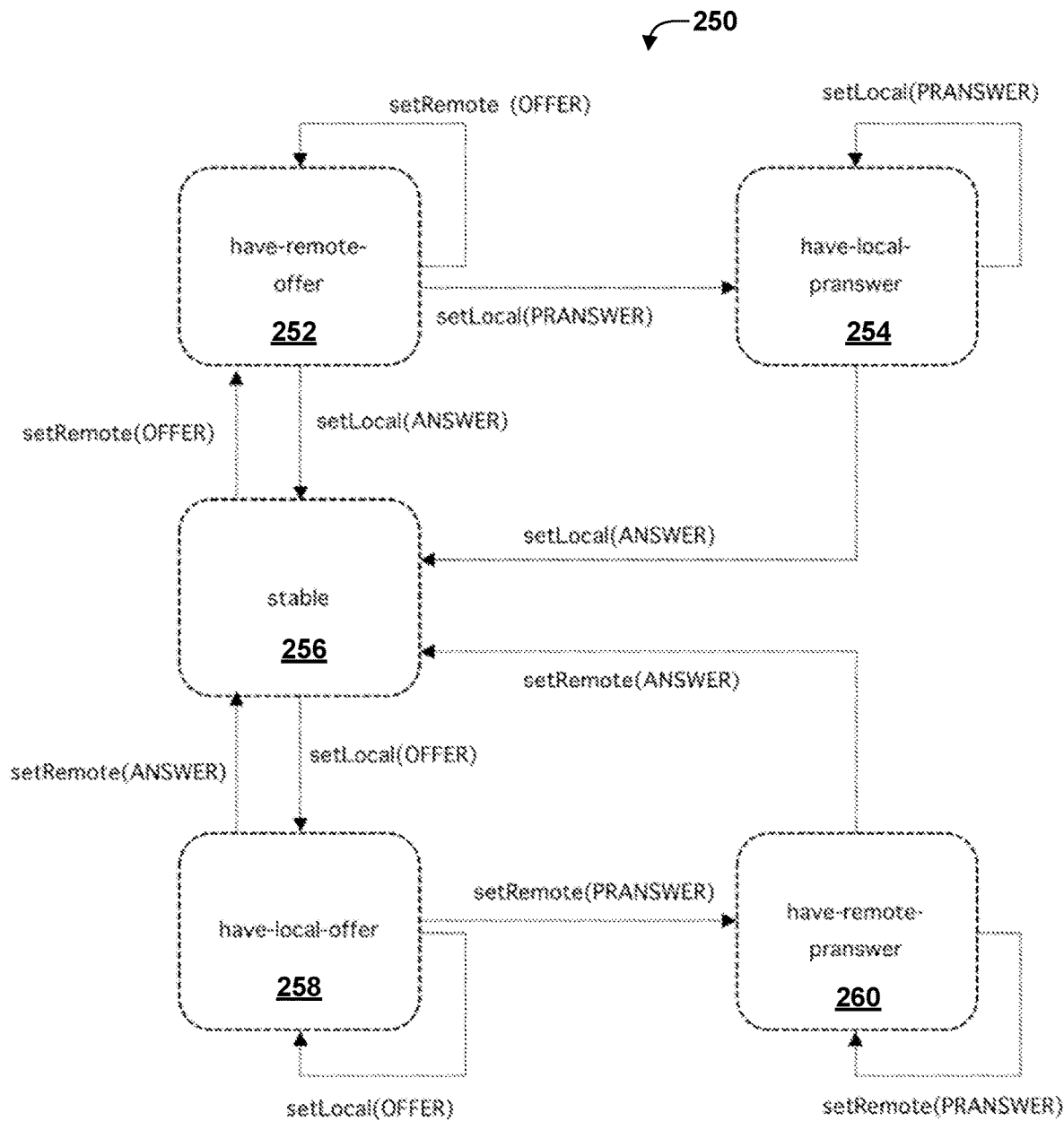
FIG. 5 is a state transition diagram illustrating an example process 250 for initiating media communication sessions via WebRTC.

FIG. 5 is a state transition diagram illustrating an example process 250 for initiating media communication sessions via WebRTC. Once a WebRTC session has been initiated, a WebRTC client may begin in stable state 256. In stable state 256, it is assumed that there is no current, ongoing exchange of an offer and answer. To initiate each media communication session (such as an audio communication session or a video communication session), the WebRTC client may send or receive offers representing SDP data including, for example, supported CODECs, formatting, or the like.

In stable state 256, the WebRTC client may receive a local offer from a local element of the client device including the WebRTC client. In response to receiving the local offer (setLocal(OFFER)), the WebRTC client may transition to have-local-offer state 258. The WebRTC client may then send the offer to the peer WebRTC client. In response to receiving an answer from the peer WebRTC client (setRemote(PRANSWER)), the WebRTC client may transition to have-remote-pranswer state 260. The WebRTC client may then perform ICE negotiations with the peer WebRTC client, including (per the techniques of this disclosure) providing QoS flow data to a server device executing an AF for the ICE candidates. The WebRTC client may then transition back to stable state 256.

On the other hand, in stable state 256, the WebRTC client may receive a remote offer from the peer WebRTC client. In response to receiving the remote offer (setRemote(OFFER)), the WebRTC client may transition to have-remote-offer state 252. The remote offer may include SDP data representing supported CODECs, formatting, or the like for a new media communication session proposed by the peer WebRTC client. The WebRTC client may determine which of the offered elements are supported by the host client device executing the WebRTC client, and formulate a response. After sending the response to the peer WebRTC client (setLocal(PRANSWER)), the WebRTC client may transition to have-local-pranswer state 254. Once again, the WebRTC client may perform ICE negotiation, including sending QoS flow data to the server executing the AF according to the techniques of this disclosure, then transition back to stable state 256.

Figure 6:
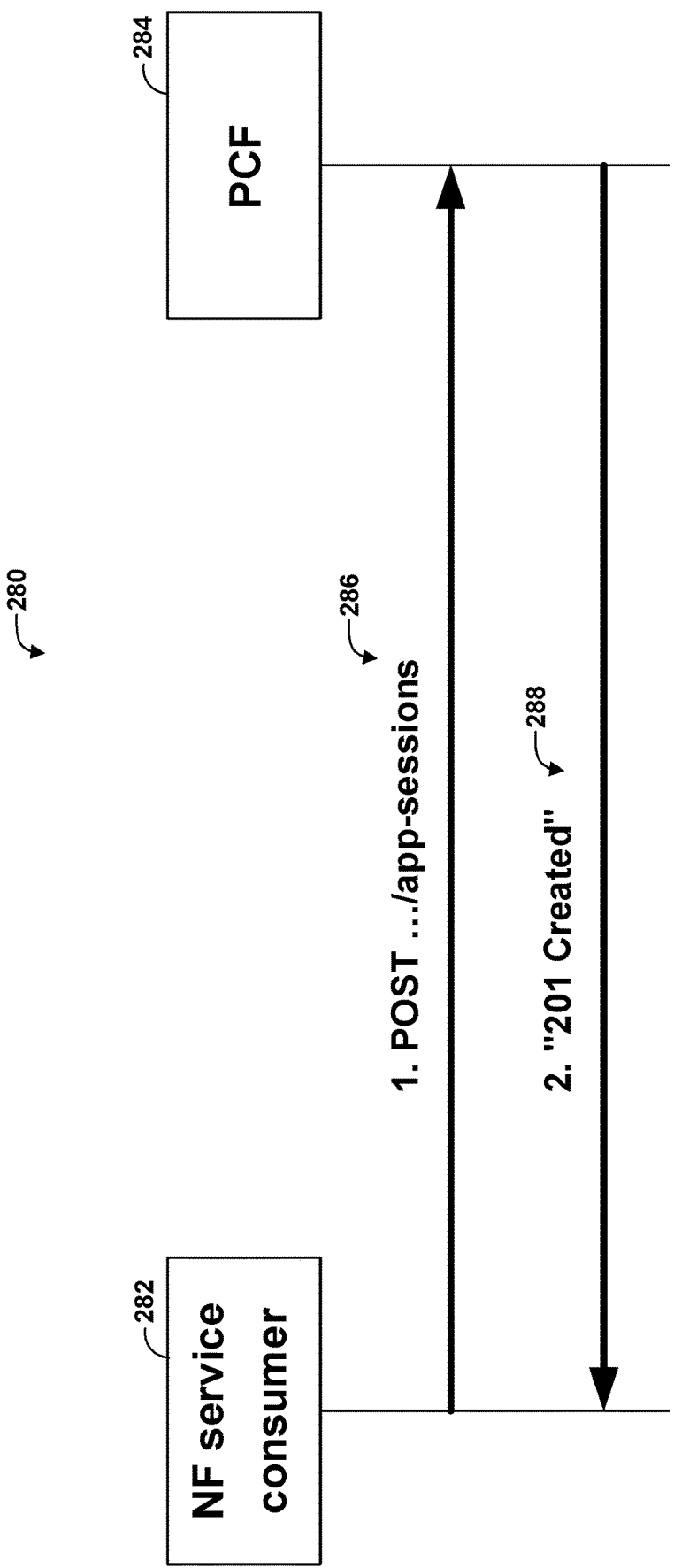
FIG. 6 is a flow diagram illustrating an example process for creating a new application session context for managing a quality of service (QoS) flow.

FIG. 6 is a flow diagram illustrating an example service 280 for creating a new application session context for managing a quality of service (QoS) flow. A network function (NF) service consumer 282 and a policy control function (PCF) 284 participate in service 280. PCF 284 offers services to NF service consumer 282, such as a proxy-call session control function (P-CSCF) or application functions (AFs), to request the allocation of QoS for a specific QoS flow that they manage. NF service consumer 282 (e.g., a WebRTC client or other application executed by a client device/UE) may send an HTTP POST message specifying one or more application sessions 286 to PCF 284, and PCF 284 may respond with an HTTP 201 "created" success message to NF service consumer 282. Service 280 may be used to create a new Application Session Context for the management of a QoS flow.

For real-time media, the Application Session Context may provide a per media component description of the QoS flow and the requested QoS parameters. The following table depicts a subset of the parameters that are included in the request.

A FlowDescription is provided for each media sub-component, which includes a 5-Tuple, that describes the QoS Flow accurately. For example, the 5-tuple may include a source IP address, source port, destination IP address, destination port, and protocol for a QoS Flow. The QoS requirements are indicated by component and include bandwidth, latency, and packet loss indications.

| Attribute name | Data type | P | Cardinality | Description | Applicability |
|---|---|---|---|---|---|
| . | | | | | |
| . | | | | | |
| . | | | | | |
| medComponents | map(MediaComponent) | O | 1 . . . N | Media Component information. The key of the map is the attribute "medCompN". | |
| . | | | | | |
| . | | | | | |
| desMaxLatency | Float | O | 0 . . . 1 | Indicates a maximum desirable transport level packet latency in milliseconds. | FLUS, QoSHint |

-continued

| Attribute name | Data type | P | Cardinality | Description | Applicability |
|---|---|---|---|---|---|
| desMaxLoss | Float | O | 0 . . . 1 | Indicates the maximum desirable transport level packet loss rate in percent (without "%" sign). | FLUS, QoSHint |
| medSubComps | map(MediaSubComponent) | O | 1 . . . N | Contains the requested bitrate and filters for the set of service data flows identified by their common flow identifier. The key of the map is the attribute "fNum". | |
| . . . | | | | | |
| medType | MediaType | O | 0 . . . 1 | Indicates the media type of the service. | |
| marBwUl | BitRate | O | 0 . . . 1 | Maximum requested bandwidth for the Uplink. | |
| marBwDl | BitRate | O | 0 . . . 1 | Maximum requested bandwidth for the Downlink. | |
| maxPacketLossRateDl | PacketLossRateRm | O | 0 . . . 1 | Indicates the downlink maximum rate for lost packets that can be tolerated for the service data flow. | CHEM |
| maxPacketLossRateUl | PacketLossRateRm | O | 0 . . . 1 | Indicates the uplink maximum rate for lost packets that can be tolerated for the service data flow. | CHEM |
| maxSuppBwDl | BitRate | O | 0 . . . 1 | Maximum supported bandwidth for the Downlink. | IMS_SBI |
| maxSuppBwUl | BitRate | O | 0 . . . 1 | Maximum supported bandwidth for the Uplink. | IMS_SBI |
| minDesBwDl | BitRate | O | 0 . . . 1 | Minimum desired bandwidth for the Downlink. | IMS_SBI |
| minDesBwUl | BitRate | O | 0 . . . 1 | Minimum desired bandwidth for the Uplink. | IMS_SBI |
| mirBwUl | BitRate | O | 0 . . . 1 | Minimum requested bandwidth for the Uplink. | |
| mirBwDl | BitRate | O | 0 . . . 1 | Minimum requested bandwidth for the Downlink. | |
| rrBw | BitRate | O | 0 . . . 1 | Indicates the maximum required bandwidth in bits per second for RTCP receiver reports within the session component as specified in IETF RFC 3556 [37]. The bandwidth contains all the overhead coming from the IP-layer and the layers above, i.e. IP, UDP and RTCP. | IMS_SBI |
| rsBw | BitRate | O | 0 . . . 1 | Indicates the maximum required bandwidth in bits per second for RTCP sender reports within the session component as specified in IETF RFC 3556 [37]. The bandwidth contains all the overhead coming from the IP-layer and the layers above, i.e. IP, UDP and RTCP. | IMS_SBI |

-continued

| Attribute name | Data type | P | Cardinality | Description | Applicability |
|---|---|---|---|---|---|
| codecs | array(CodecData) | O | 1 . . . 2 | Indicates the codec data. | |
| fDescs | array(FlowDescription) | O | 1 . . . 2 | Contains the flow description for the Uplink and/or Downlink IP flows. | |
| flowUsage | FlowUsage | O | 0 . . . 1 | Flow usage of the flows (e.g. RTCP, AF signalling). | |
| marBwUl | BitRate | O | 0 . . . 1 | Maximum requested bandwidth for the Uplink. | |
| marBwDl | BitRate | O | 0 . . . 1 | Maximum requested bandwidth for the Downlink. | |
| tosTrCl | TosTrafficClass | O | 0 . . . 1 | Type of Service or Traffic Class. | |

To request the application of a policy to a streaming session, the user equipment (UE) uses the Dynamic Policies API, that is exposed by the 5G Media Streaming (5GMS) application function (AF), to provide information about the session and requested QoS to the 5GMS AF. The Media Session Handler (MSH) in the UE gathers this information from the application. Certain example parameters that are included as part of the request to the 5GMS AF are shown in the following table:

| Property name | Data type | Cardinality | Usage | Description |
|---|---|---|---|---|
| dynamicPolicyId | ResourceId | 1 . . . 1 | RO | Unique identifier for this Dynamic Policy. |
| policyTemplateId | ResourceId | 1 . . . 1 | C: RW<br>R: RO<br>U: RW | Identifies the Policy Template which should be applied to the application flow(s). |
| serviceDataFlowDescriptions | Array(ServiceDataFlowDescription) | 1 . . . 1 | C: RW<br>R: RO<br>U: RW | Describes the service data flows managed by this Dynamic Policy. |
| provisioningSessionId | ResourceId | 1 . . . 1 | C: RW<br>R: RO<br>U: RW | Uniquely identifies Provisioning Session, which is linked to the Application Service Provider. |
| qosSpecification | M5QoSSpecification | 0 . . . 1 | C: RW<br>R: RO<br>U: RW | Describes the network Quality of Service properties of this Dynamic Policy. |
| enforcementMethod | String | 0 . . . 1 | C: RO<br>R: RO<br>U: RO | Description of the Policy Enforcement Method. The parameter is set by the 5GMSd AF. |
| enforcementBitRate | Integer | 0 . . . 1 | C: RO<br>R: RO<br>U: RO | Description of the enforcement bit rate. |

The QoS information can be provided as a reference to a pre-defined QoS template that was set up during the provisioning step or as a set of QoS parameters.

Figure 7:
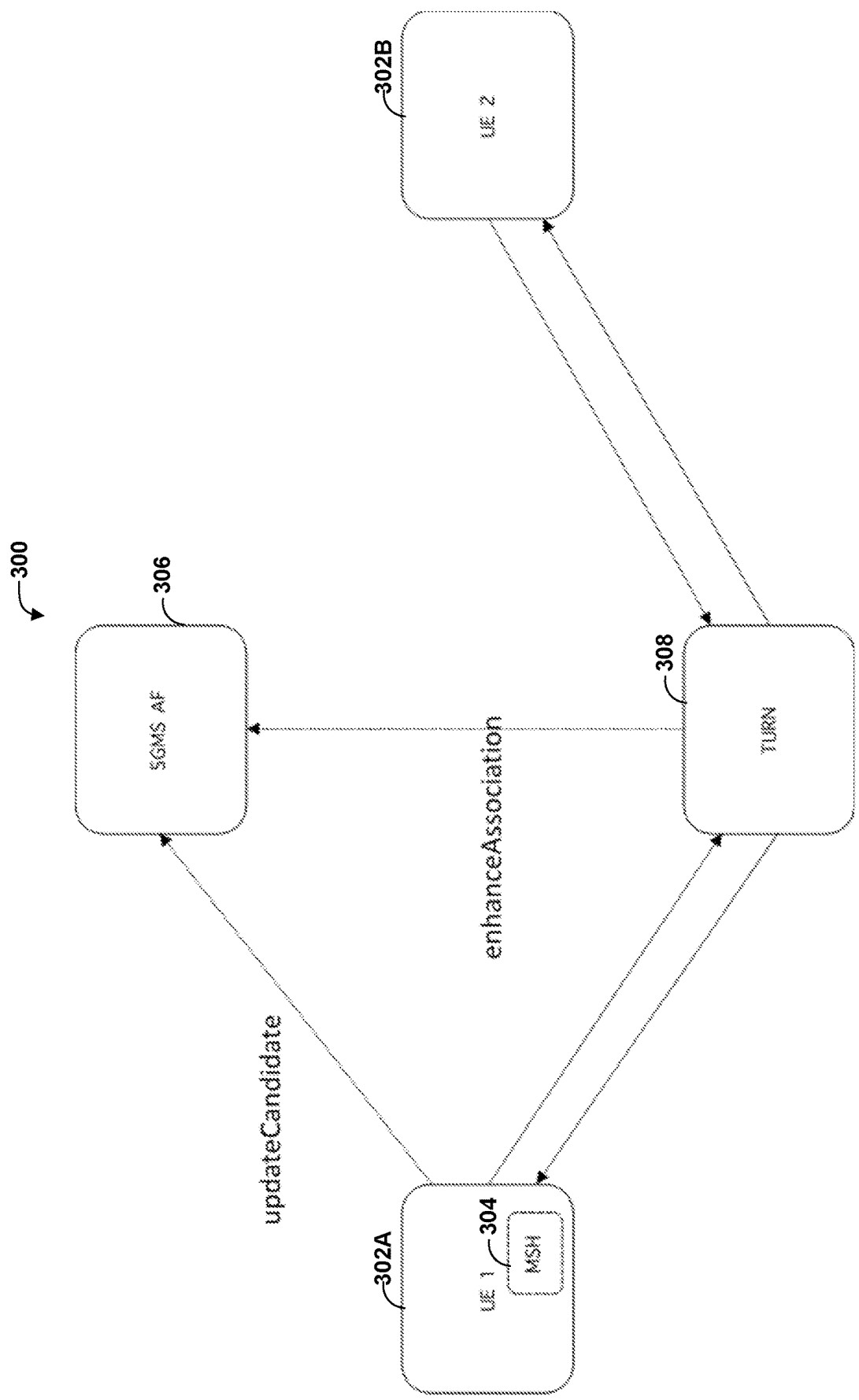
FIG. 7 is a block diagram illustrating an example network that may apply the techniques of this disclosure to establish a quality of service (QoS) flow for a media communication session between client devices.

FIG. 7 is a block diagram illustrating an example network 300 that may apply the techniques of this disclosure to establish a quality of service (QoS) flow for a media communication session between client devices. In particular, network function (NF) consumers, such as P-CSCFs or AFs, may be configured to apply these techniques to request QoS parameters and to define a QoS flow for a communication session between client devices (e.g., UEs). In the example of FIG. 7, network 300 includes user equipment (UE) 302A, 302B (UEs 302), Traversal Using Relay Network Address Translation (NAT) (TURN) server 308, and 5GMS AF 306. UEs 302 may correspond to client devices 110 of FIG. 1, and 5GMS AF 306 may correspond to server device 102 of FIG. 1. In this example, UE 302A also includes media session handler 304.

5GMS AF 306 may offer TURN server 308, a Session Traversal of UDP (STUN) server, and/or a multipoint control unit (MCU) (STUN server and MCU not shown in the example of FIG. 7) to user equipment (UE). In particular, 5GMS AF 306 may send information to MSH 304 as part of a Service Access Information API. This information can be passed as part of the configuration of the RTCPeerConnection to allow for proper interactive connectivity establishment (ICE) negotiation.

UE 302A, in this example, may send an updateCandidate message to 5GMS AF 306. UE 302A may include a qosReference in the updateCandidate message. Including the qosReference in the updateCandidate message, when updating the QoS flow description upon successful ICE negotiation, may result in forming an association between a QoS Flow description and a QoS specification. UE 302A may include the following information in the request:

| Property name | Data type | Cardinality | Usage | Description |
| --- | --- | --- | --- | --- |
| FlowAssociations | Array(Object) | 1 . . . 1 | | Array of associations between QoS flow descriptions and their associated QoS specification. |
| serviceDataFlowDescription | ServiceDataFlowDescription | 1 | C: RW R: RO U: RW | Describes the service data flow for which the requested QoS is provided. Note that RTP and RTCP flows are considered separate, unless they are multiplexed. |
| qosReference | string | 1 | C: RW R: RO U: RW | Provides a reference to the QoS specification, which is unique within the dynamic policy session. |

Each time a new ICE candidate is identified, a notification is sent to the application. The application identifies the new QoS flows associated with this new candidate and decides whether to update the QoS association with the AF. If the ICE candidate type is a "relay," this indicates that TURN server 308 will be deployed. In such case, 5GMS AF 306 will identify the corresponding QoS flows to the remote port/IP address pair and request QoS to be applied to it as well.

This is applicable to TURN servers, such as TURN server 308, that are hosted in the trusted domain. TURN servers outside a mobile network operator (MNO) network are not subject to QoS allocation. A TURN server in the trusted domain, such as TURN server 308, may be enhanced with the capability to send updates of the QoS flow description to 5GMS AF 306 directly. Alternatively, this can be done by a signaling server that is hosted by the MNO.

As TURN server 308 does not include information indicative of the location of 5GMS AF 306, 5GMS AF 306 probes TURN server 308 to detect support for the 5G enhanced functionality. If TURN server 308 does support this enhanced functionality, it will respond with the actual mapping between the QoS flow to UE 302A and the QoS flow to UE 302B. 5GMS AF 306 can then subsequently apply the QoS specification to the second segment of the connection. The association may be established by providing the description of the QoS flow to UE 302A.

Figure 8:
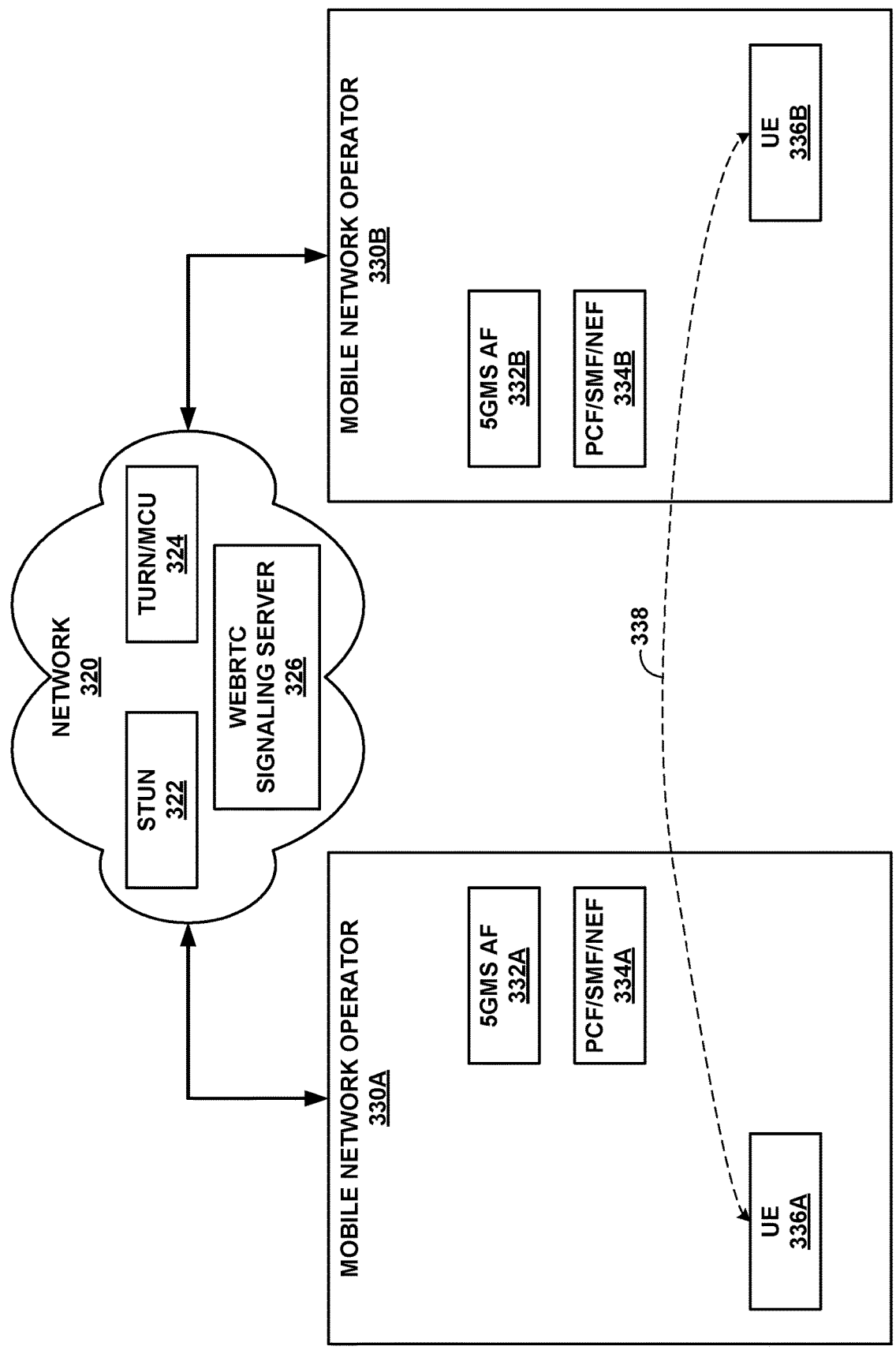
FIG. 8 is a block diagram illustrating an example collaboration scenario in which the techniques of this disclosure may be used.

FIG. 8 is a block diagram illustrating an example collaboration scenario in which the techniques of this disclosure may be used. The example of FIG. 8 includes network 320 and mobile network operators (MNOs) 330A, 330B (MNOs 330).

Network 320 includes STUN server 322, TURN/MCU server 324, and WebRTC signaling server 326. MNOs 330 include respective 5GMS AFs 332A, 332B (5GMS AFs 332), PCF/session management function (SMF)/network exposure function (NEF) 334A, 334B (PCF/SMF/NEFs 334), and user equipment (UE) 336A, 336B (UEs 336).

UEs 336 may include components similar to those of client device 120 of FIG. 2. UEs 336 may perform the techniques of this disclosure to initiate media communication session 338. In this example, UEs 336 are coupled to different respective MNOs 330. That is, UE 336A is coupled to MNO 330A and UE 336B is coupled to MNO 330B. UE 336A may initiate media communication session 338 with UE 336B. Initially, UE 336A may send a STUN request to STUN server 322 to determine its own public IP address and port values. UE 336A may then construct a list of ICE candidates representing the pairs of IP address and port values received from STUN server 322. UE 336A may then send the list of ICE candidates to UE 336B.

In response, UE 336B may request its public IP address and port values from STUN server 322. UE 336B may then generate a list of ICE candidates including pairs of IP address and port values for itself, and send this list of ICE candidates back to UE 336A.

UE 336A may receive the list of ICE candidates from UE 336B and then validate the ICE candidates in the list. For example, UE 336A may send a STUN request to each IP address and port of the ICE candidates and determine which STUN requests result in responses. For each IP address and port pair for which a response to the STUN request is received, UE 336A may determine that the corresponding ICE candidate is valid. UE 336B may similarly determine which of the ICE candidates received from UE 336A are valid.

After determining the valid ICE candidates, UE 336A may send data representing the valid ICE candidates and quality of service (QoS) flows to 5GMS AF 332A. 5GMS AF 332A may provide media control for media communication session 338. Similarly, UE 336B may send data representing the valid ICE candidates and QoS flows to 5GMS AF 332B, which may additionally or alternatively provide media control for media communication session 338. UEs 336 may negotiate a pair of valid IP ICE candidates for each of UE 336A and UE 336B to establish media communication session 338. Furthermore, UEs 336 may determine an association between a QoS specification and the one of the QoS flows for the media communication session, and apply QoS to media communication session 338 according to the QoS specification.

The example of FIG. 8 provides over-the-top (OTT) WebRTC with 5G support. WebRTC functions may be hosted by WebRTC signaling server 326, which may be an application service provider. MNOs 330 may provide network assistance and QoS to UEs 336. In particular, UEs 336 may execute respective WebRTC applications, which may pass information to respective MSHs of UEs 336. The MSHs may use service based architecture (SBA) procedures to invoke the network assistance and QoS. In one alternative example, WebRTC signaling server 326 may communicate with PCF/SMF/NEFs 334.

Figure 9:
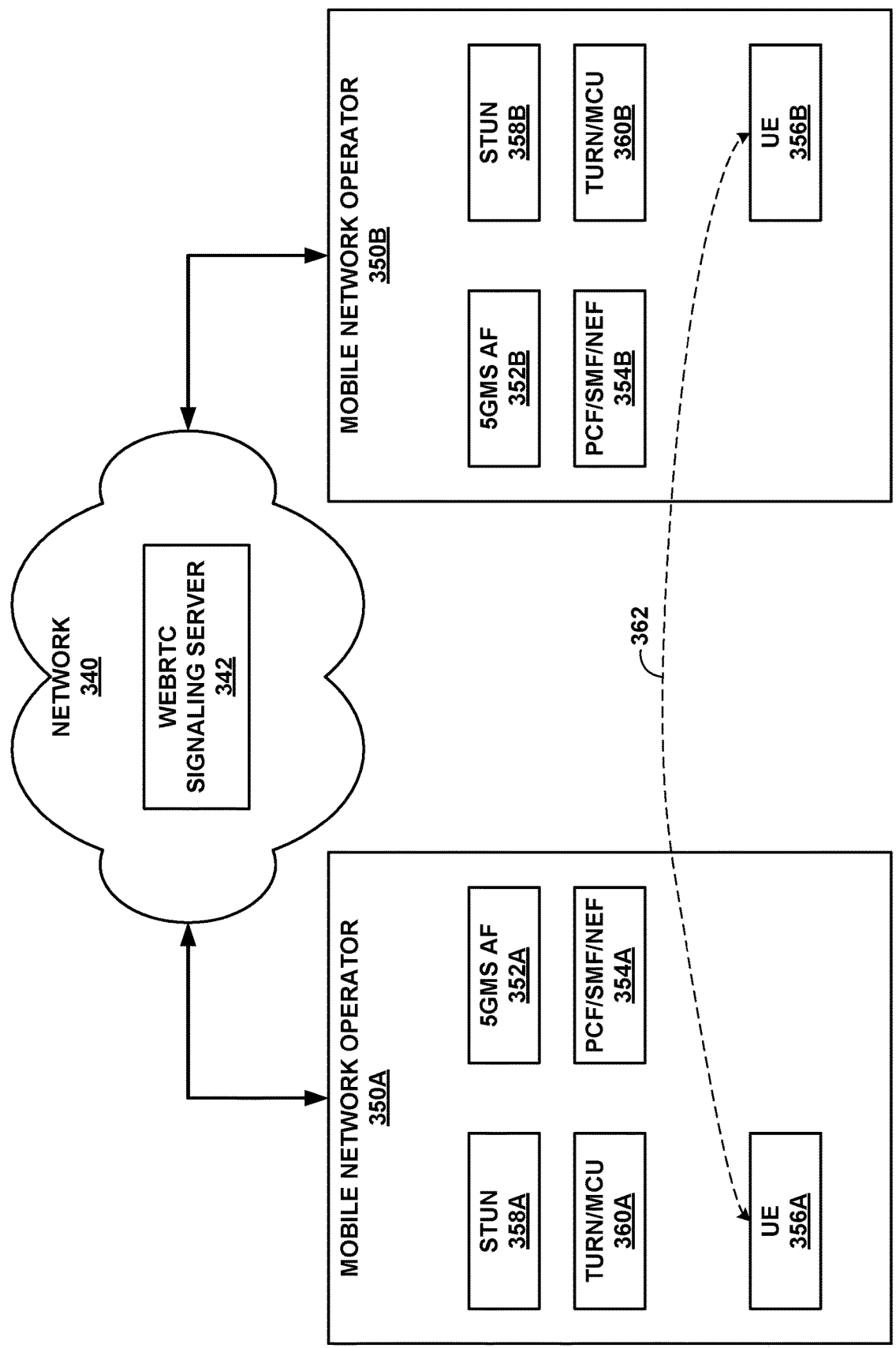
FIG. 9 is a block diagram illustrating another example collaboration scenario in which the techniques of this disclosure may be used.

FIG. 9 is a block diagram illustrating another example collaboration scenario in which the techniques of this disclosure may be used. The example of FIG. 9 depicts network 340 including WebRTC signaling server 342 and MNOs 350A, 350B (MNOs 350). MNOs 350 include respective 5GMS AFs 352A, 352B (5GMS AFs 352), PCF/SMF/NEFs 354A, 354B (PCF/SMF/NEFs 354), STUN servers 358A, 358B (STUN servers 358), TURN/MCU servers 360A, 360B (TURN/MCU servers 360), and UEs 356A, 356B (UEs 356).

In general, the process performed by UEs 356 of FIG. 9 may be substantially similar to those performed by UEs 336 of FIG. 8 to establish and participate in media communication session 362. In this example, however, MNOs 350 provide respective STUN servers 358 and TURN/MCU servers 360, instead of the STUN and TURN/MCU servers being provided separately. Thus, in this example, WebRTC functions are provided by a trusted MNO, namely, MNOs 350. MNOs 350 may provide WebRTC functions to customers, such as users of UEs 356. The WebRTC applications executed by UEs 356 may discover STUN servers 358 and TURN/MCU servers 360 through respective MNOs 350 and include them in the ICE negotiation. STUN servers 358 and TURN/MCU servers 360 may extract information, such as a network 5-tuple (source IP address, destination IP address, source port, destination port, and protocol) and pass this information to 5GMS AFs 352 and/or PCF/SMF/NEFs 354. STUN servers 358 and TURN/MCU servers 360 may be implemented as 5G application functions or 5G application servers, in various examples.

Figure 10:
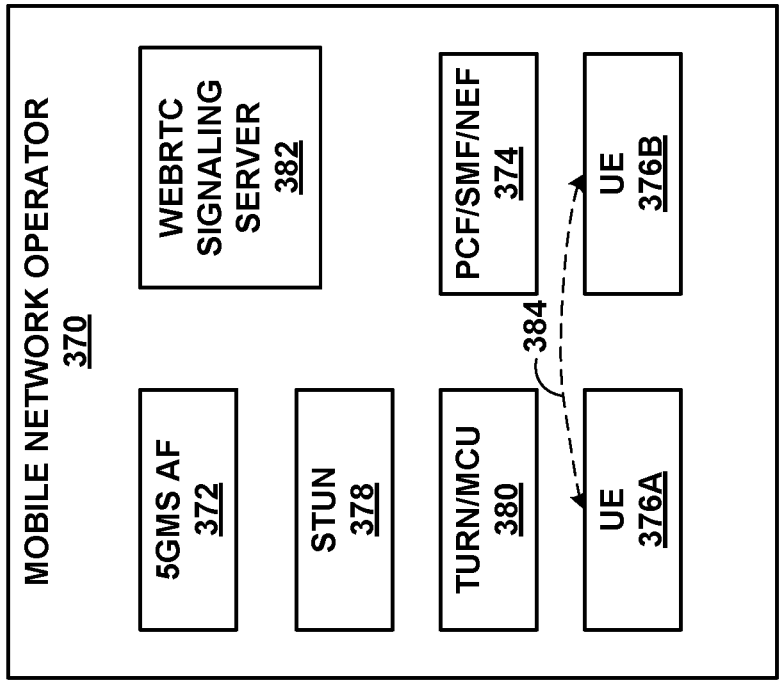
FIG. 10 is a block diagram illustrating another example collaboration scenario in which the techniques of this disclosure may be used.

FIG. 10 is a block diagram illustrating another example collaboration scenario in which the techniques of this disclosure may be used. The example of FIG. 10 depicts MNO 370, which includes 5GMS AF 372, PCF/SMF/NEF 374, UEs 376A, 376B (UEs 376), STUN server 378, TURN/MCU server 380, and WebRTC signaling server 382.

In general, the process performed by UEs 376 of FIG. 10 may be substantially similar to those performed by UEs 336 of FIG. 8 to establish and participate in media communication session 384. In this example, however, UEs 376 are each coupled to the same MNO, i.e., MNO 370. Likewise, MNO 370 provides each of the various network components and services used for WebRTC in this example. That is, in this example, there are MNO-facilitated WebRTC services. MNO 370 may own or offer the WebRTC services on behalf of an application provider. This example may be used for split rendering when UEs 376 perform different parts of a rendering process, e.g., for XR, MR, AR, VR, or the like. This example may implement a standardized WebRTC signaling protocol.

In this example, WebRTC signaling server 382 may receive the SDP offer and provide an SDP answer. WebRTC signaling server 382 may extract media and 5-tuple information and pass this information to 5GMS AF 372 and/or PCF/SMF/NEF 374. WebRTC signaling server 382 may be implemented as a 5G application function or a 5G application server in some examples.

Figure 11:
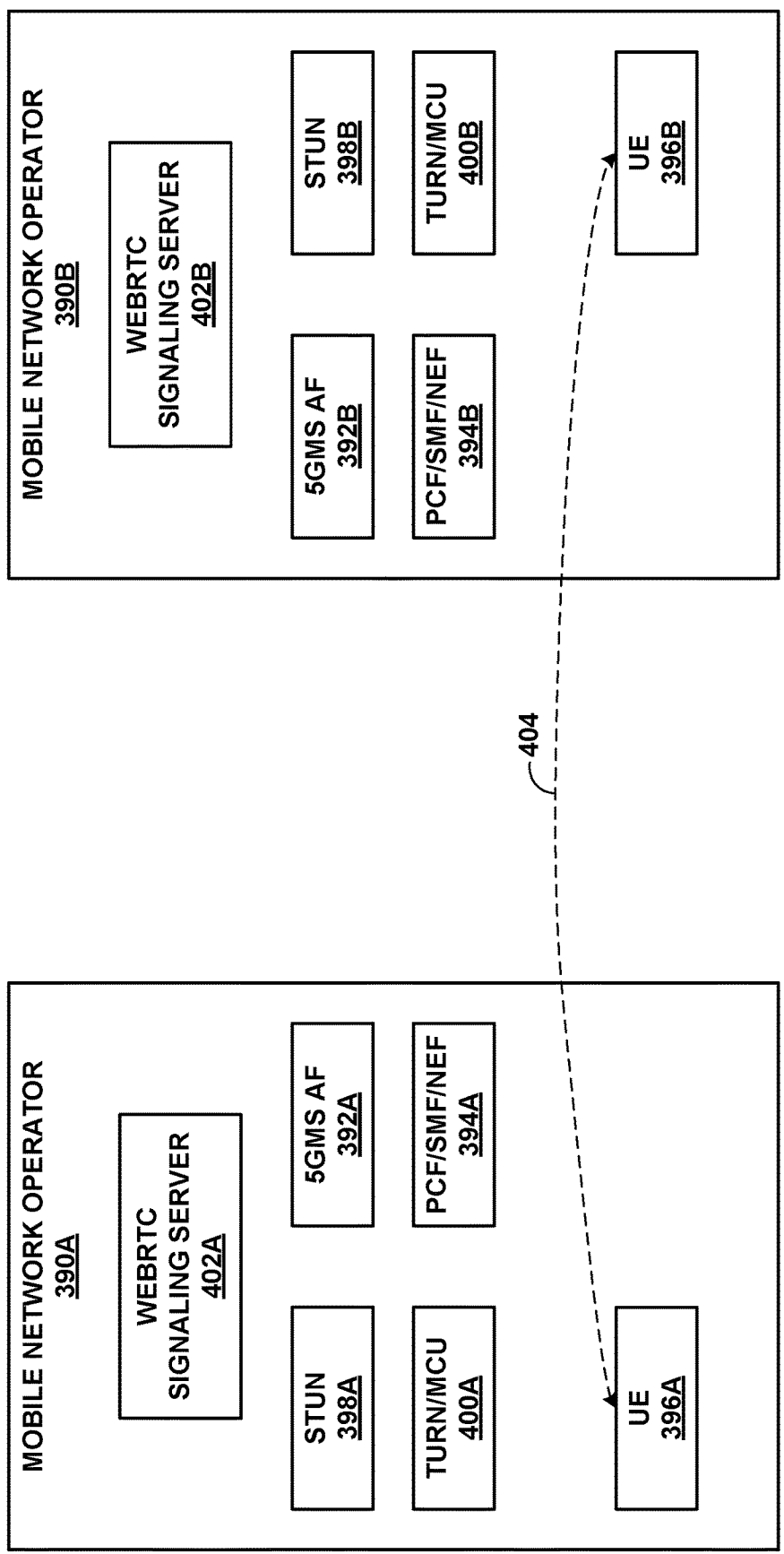
FIG. 11 is a block diagram illustrating another example collaboration scenario in which the techniques of this disclosure may be used.

FIG. 11 is a block diagram illustrating another example collaboration scenario in which the techniques of this disclosure may be used. The example of FIG. 11 depicts MNOs 390A, 390B (MNOs 390). Each of MNOs 390 includes respective WebRTC signaling servers 402A, 402B (WebRTC signaling servers 402), 5GMS AFs 392A, 392B (5GMS AFs 392), PCF/SMF/NEFs 394A, 394B (PCF/SMF/NEFs 394), UEs 396A, 396B (UEs 396), STUN servers 398A, 398B (STUN servers 398), and TURN/MCU servers 400A, 400B (TURN/MCU servers 400). In this example, UEs 396A and 396B perform techniques of this disclosure to establish media communication session 404.

In general, the process performed by UEs 396 of FIG. 11 may be substantially similar to those performed by UEs 336 of FIG. 8 to establish and participate in media communication session 404. In this example, however, MNOs 390 include respective WebRTC signaling servers 402. In this manner, the example of FIG. 11 provides interoperable WebRTC services. That is, the WebRTC services are MNO-facilitated and operate across MNOs 390. WebRTC signaling servers 402 may use a standardized WebRTC signaling for IOP to establish a distributed session control protocol. In this example, WebRTC signaling servers 402, STUN servers 398, and TURN/MCU servers 400 may exchange session parameters across MNOs 390.

The techniques of this disclosure may achieve certain advantages. For example, these techniques separate QoS specification from QoS flow definition, which may allow for separate ICE negotiation. Performance of these techniques may also extend the QoS specification to cover all segments of the connection. In particular, these techniques support requesting QoS for the case where a TURN server is hosted by the MNO. These techniques also allow for linkage between the QoS specification and the QoS flow descriptions.

Figure 12:
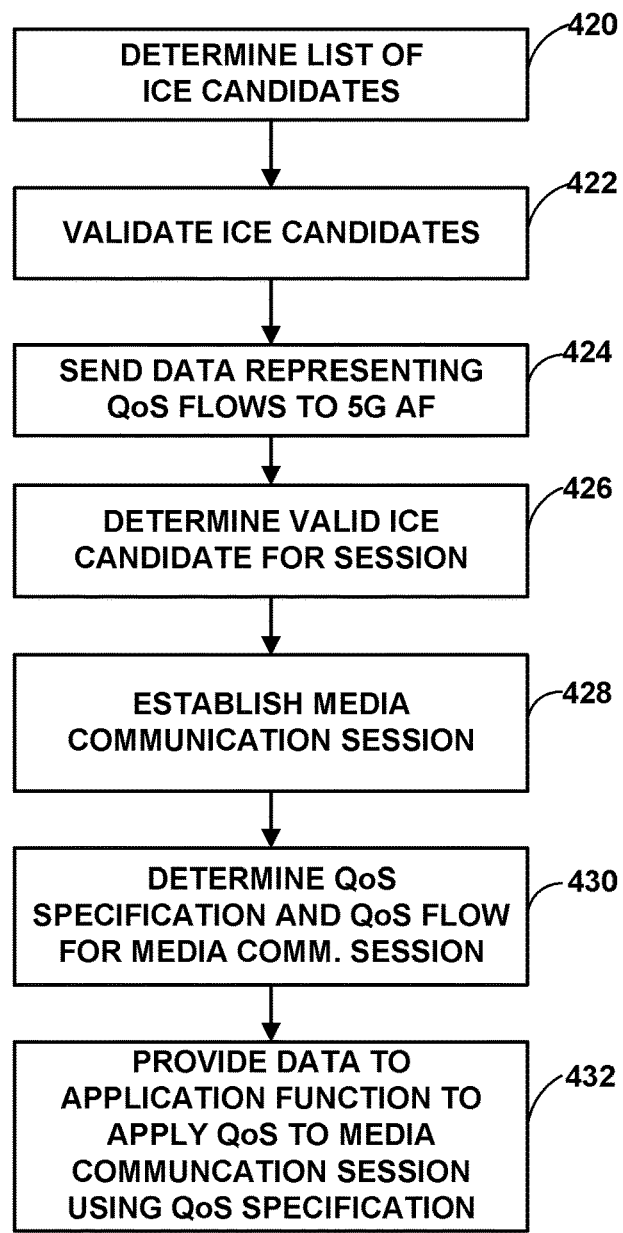
FIG. 12 is a flowchart illustrating an example method for performing techniques of this disclosure.

FIG. 12 is a flowchart illustrating an example method for performing techniques of this disclosure. The method of FIG. 11 is explained with respect to client device 120 of FIG. 2, although it should be understood that other devices, such as client devices 110 of FIG. 1, UEs 302 of FIG. 7, UEs 336 of FIG. 8, UEs 356 of FIG. 9, UEs 376 of FIG. 10, or UEs 396 of FIG. 11, may also be configured to perform this or a similar method.

Initially, client device 120 may determine a list of ICE candidates (420) for a peer client device with which to initiate a media communication session. For example, client device 120 may send a request to the peer client device and receive, in response to the request, a list of ICE candidates from the peer client device. The list of ICE candidates may include a list of pairs of IP addresses and ports by which the peer client device can be reached. Each of client device 120 and the peer client device may be connected to a network device that performs network address translation (NAT) to convert between the public IP address and a private IP address for a private network to which the client device is communicatively coupled, e.g., a network provided by a mobile network operator (MNO).

Client device 120 may then validate ICE candidates in the list of ICE candidates (422). For example, client device 120 may send STUN requests to each IP address and port in the list received from the peer client device, and determine that ICE candidates for which responses are received to the STUN requests are valid. Client device 120 may send data representing QoS flows for the valid ICE candidates to a 5GMS application function (AF), which may be executed by a server device forming part of the MNO or other private network to which client device 120 is connected (424).

Client device 120 may then determine one or more of the valid ICE candidates to use for the media communication session (426). For example, client device 120 may negotiate with the peer network device to determine respective pairs of IP addresses and ports for each of client device 120 and the peer client device for a particular media communication session. Client device 120 may then establish the media communication session (428). For example, client device 120 may perform the techniques discussed with respect to FIG. 5 to establish a particular media communication session, e.g., by sending an SDP offer to the peer client device and receiving an SDP answer from the peer client device, or by receiving an SDP offer from the peer client device and responding with an SDP answer to the peer client device.

Furthermore, client device 120 may determine a QoS specification and QoS flow for the media communication session (430). Client device 120 may provide data to an application function (e.g., application function 104 of FIG. 1) to cause the application function to apply QoS to the media communication session using the QoS specification (432) and the QoS flow associated with the determined ICE candidate for the media communication session. For example, client device 102 may invoke QoS provided by a mobile network operator (MNO) that operates server device 102 and application 104 of FIG. 1.

In this manner, the method of FIG. 11 represents an example of a method including determining, by a first client device, a list of interactive connectivity establishment (ICE) candidates for a second client device; determining, by the first client device, valid ICE candidates in the list of ICE candidates for the second client device; for one or more of the valid ICE candidates, sending, by the first client device, data representing quality of service (QoS) flows associated with the one or more of the valid ICE candidates to a server device executing an application function (AF), the AF providing media control for the media communication session; determining, by the first client device, one of the valid ICE candidates and one of the QoS flows associated with the one of the valid ICE candidates; establishing, by the first client device, the media communication session with the second client device using the determined one of the valid ICE candidates; determining, by the first client device, an association between a QoS specification and the one of the QoS flows for the media communication session; and providing, by the first client device, data to the AF to apply QoS to the media communication session according to the QoS specification.

Certain example techniques of this disclosure are summarized in the following clauses:

Clause 1: A method of applying quality of service to a media communication session, the method comprising: determining, by a first client device, a list of interactive connectivity establishment (ICE) candidates; sending, by the first client device, a media communication session request to a second client device, the media communication session request including data representing the list of ICE candidates; determining, by the first client device, valid ICE candidates in the list of one or more of the ICE candidates; for one or more of the valid ICE candidates, sending, by the first client device, data representing quality of service (QoS) flows associated with the one or more of the valid ICE candidates to a server device executing an application function (AF), the AF providing media control for the communication session; determining, by the first client device, one of the valid ICE candidates and one of the QoS flows associated with the one of the valid ICE candidates; determining, by the first client device, an association between a QoS specification with the one of the QoS flows; and applying, by the first client device, QoS to the communication session according to the QoS specification.

Clause 2: The method of clause 1, further comprising receiving, from the server device executing the AF, data representing at least one of a Traversal Using Relay NAT (TURN) server or a Session Traversal of UDP (STUN) server.

Clause 3: The method of any of clauses 1 and 2, wherein the data representing the QoS flows associated with the one or more of the valid ICE candidates includes data representing associations between QoS flow descriptions and QoS specifications.

Clause 4: The method of any of clauses 1-3, wherein the data representing the QoS flows associated with the one or more of the valid ICE candidates includes data describing a service data flow for which QoS is provided.

Clause 5: The method of any of clauses 1-4, wherein the data representing the QoS flows associated with the one or more of the valid ICE candidates includes a reference to the QoS specification.

Clause 6: The method of any of clauses 1-5, further comprising sending an update message to the server device executing the AF including data associating one of the valid ICE candidates with one of the QoS flows.

Clause 12: A device for applying quality of service to a media communication session, the device comprising one or more means for performing the method of any of clauses 1-6.

Clause 13: The device of clause 12, wherein the one or more means comprise one or more processors implemented in circuitry.

Clause 14: The device of any of clauses 12 and 13, further comprising a display.

Clause 15: The device of any of clauses 12-14, wherein the device comprises one or more of a camera, a computer, a mobile device, a broadcast receiver device, or a set-top box.

Clause 16: The device of clause 12-15, further comprising a memory.

Clause 17: A computer-readable storage medium having stored thereon instructions that, when executed, cause a processor to perform the method of any of clauses 1-6.

Clause 18: A first client device for applying quality of service to a media communication session, the first client device comprising: means for determining a list of interactive connectivity establishment (ICE) candidates; means for sending a media communication session request to a second client device, the media communication session request including data representing the list of ICE candidates; means for determining valid ICE candidates in the list of ICE candidates; means for sending, for one or more of the valid ICE candidates, data representing quality of service (QoS) flows associated with the one or more of the valid ICE candidates to a server device executing an application function (AF), the AF providing media control for the communication session; means for determining one of the valid ICE candidates and one of the QoS flows associated with the one of the valid ICE candidates; means for determining an association between a QoS specification with the one of the QoS flows; and means for applying QoS to the communication session according to the QoS specification.

Clause 19: A method of applying quality of service to a media communication session, the method comprising: determining, by a first client device, a list of interactive connectivity establishment (ICE) candidates for a second client device; determining, by the first client device, valid ICE candidates in the list of ICE candidates; for one or more of the valid ICE candidates, sending, by the first client device, data representing quality of service (QoS) flows associated with the one or more of the valid ICE candidates to a server device executing an application function (AF), the AF providing media control for the media communication session; determining, by the first client device, one of the valid ICE candidates and one of the QoS flows associated with the one of the valid ICE candidates; establishing, by the first client device, the media communication session with the second client device using the determined one of the valid ICE candidates; determining, by the first client device, an association between a QoS specification and the one of the QoS flows for the media communication session; and providing, by the first client device, data to the AF to apply QoS to the media communication session according to the QoS specification.

Clause 20: The method of clause 19, wherein determining the list of ICE candidates comprises: receiving data defining a plurality of ICE candidates; and forming the list of ICE candidates to include one or more of the plurality of ICE candidates.

Clause 21: The method of clause 19, wherein the first client device is communicatively coupled to a first mobile network operator (MNO), the second client device is communicatively coupled to a second MNO, and providing the data to the application function to apply QoS to the media communication session comprises invoking QoS provided by the first MNO using a service based architecture (SBA) procedure offered by the first MNO.

Clause 22: The method of clause 19, wherein the first client device is communicatively coupled to a first mobile network operator (MNO), the second client device is communicatively coupled to a second MNO, and determining the list of ICE candidates comprises receiving data representing one or more of the ICE candidates from the first MNO.

Clause 23: The method of clause 19, wherein the first client device is communicatively coupled to a mobile network operator (MNO) and the second client device is communicatively coupled to the MNO.

Clause 24: The method of clause 19, further comprising receiving, from the server device executing the AF, data representing at least one of a Traversal Using Relay Network Address Translation (TURN) server or a Session Traversal of UDP (STUN) server.

Clause 25: The method of clause 19, wherein the data representing the QoS flows associated with the one or more of the valid ICE candidates includes data representing associations between QoS flow descriptions and QoS specifications.

Clause 26: The method of clause 19, wherein the data representing the QoS flows associated with the one or more of the valid ICE candidates includes data describing a service data flow for which QoS is provided.

Clause 27: The method of clause 19, wherein the data representing the QoS flows associated with the one or more of the valid ICE candidates includes a reference to the QoS specification.

Clause 28: The method of clause 19, further comprising sending an update message to the server device executing the AF including data associating one of the valid ICE candidates with one of the QoS flows.

Clause 29: The method of clause 19, wherein the media communication session comprises a Web Real-Time Communication (WebRTC) communication session.

Clause 30: A first client device for applying quality of service to a media communication session, the first client device comprising: a memory configured to store media data; and one or more processors implemented in circuitry and configured to: determine a list of interactive connectivity establishment (ICE) candidates for a second client device; determine valid ICE candidates in the list of ICE candidates; for one or more of the valid ICE candidates, send data representing quality of service (QoS) flows associated with the one or more of the valid ICE candidates to a server device executing an application function (AF), the AF providing media control for the media communication session; determine one of the valid ICE candidates and one of the QoS flows associated with the one of the valid ICE candidates; establish the media communication session with the second client device using the determined one of the valid ICE candidates; determine an association between a QoS specification and the one of the QoS flows for the media communication session; and provide data to the AF to apply QoS to the media communication session according to the QoS specification.

Clause 31: The first client device of clause 30, wherein to determine the list of ICE candidates, the one or more processors are configured to: receive data defining a plurality of ICE candidates; and form the list of ICE candidates to include one or more of the plurality of ICE candidates.

Clause 32: The first client device of clause 30, wherein the first client device is communicatively coupled to a first mobile network operator (MNO), the second client device is communicatively coupled to a second MNO, and to provide data to the application function to apply QoS to the media communication session, the one or more processors are configured to invoke QoS provided by the first MNO using a service based architecture (SBA) procedure offered by the first MNO.

Clause 33: The first client device of clause 30, wherein the first client device is communicatively coupled to a first mobile network operator (MNO), the second client device is communicatively coupled to a second MNO, and to determine the list of ICE candidates, the one or more processors are configured to receive data representing one or more of the ICE candidates from the first MNO.

Clause 34: The first client device of clause 30, wherein the first client device is communicatively coupled to a mobile network operator (MNO) and the second client device is communicatively coupled to the MNO.

Clause 35: The first client device of clause 30, wherein the one or more processors are further configured to receive, from the server device executing the AF, data representing at least one of a Traversal Using Relay Network Address Translation (TURN) server or a Session Traversal of UDP (STUN) server.

Clause 36: The first client device of clause 30, wherein the data representing the QoS flows associated with the one or more of the valid ICE candidates includes data representing associations between QoS flow descriptions and QoS specifications.

Clause 37: The first client device of clause 30, wherein the data representing the QoS flows associated with the one or more of the valid ICE candidates includes data describing a service data flow for which QoS is provided.

Clause 38: The first client device of clause 30, wherein the data representing the QoS flows associated with the one or more of the valid ICE candidates includes a reference to the QoS specification.

Clause 39: The first client device of clause 30, wherein the one or more processors are further configured to send an update message to the server device executing the AF including data associating one of the valid ICE candidates with one of the QoS flows.

Clause 40: The first client device of clause 30, wherein the media communication session comprises a Web Real-Time Communication (WebRTC) communication session.

Clause 41: The first client device of clause 30, further comprising a display.

Clause 42: The first client device of clause 30, wherein the first client device comprises one or more of a camera, a computer, a mobile device, a broadcast receiver device, or a set-top box.

Clause 43: A computer-readable storage medium having stored thereon instructions that, when executed, cause a processor of a first client device to: determine a list of interactive connectivity establishment (ICE) candidates for a second client device; determine valid ICE candidates in the list of ICE candidates; for one or more of the valid ICE candidates, send data representing quality of service (QoS) flows associated with the one or more of the valid ICE candidates to a server device executing an application function (AF), the AF providing media control for the media communication session; determine one of the valid ICE candidates and one of the QoS flows associated with the one of the valid ICE candidates; establish the media communication session with the second client device using the determined one of the valid ICE candidates; determine an association between a QoS specification and the one of the QoS flows for the media communication session; and provide data to the AF to apply QoS to the media communication session according to the QoS specification.

Clause 44: The computer-readable storage medium of clause 43, wherein the instructions that cause the processor to determine the list of ICE candidates comprise instructions that cause the processor to: receive data defining a plurality of ICE candidates; and form the list of ICE candidates to include one or more of the plurality of ICE candidates.

Clause 45: The computer-readable storage medium of clause 43, wherein the first client device is communicatively coupled to a first mobile network operator (MNO), the second client device is communicatively coupled to a second MNO, and the instructions that cause the processor to provide data to the application function to apply QoS to the media communication session comprise instructions that cause the processor to invoke QoS provided by the first MNO using a service based architecture (SBA) procedure offered by the first MNO.

Clause 46: The computer-readable storage medium of clause 43, wherein the first client device is communicatively coupled to a first mobile network operator (MNO), the second client device is communicatively coupled to a second MNO, and the instructions that cause the processor to determine the list of ICE candidates comprise instructions that cause the processor to receive data representing one or more of the ICE candidates from the first MNO.

Clause 47: The computer-readable storage medium of clause 43, wherein the first client device is communicatively coupled to a mobile network operator (MNO) and the second client device is communicatively coupled to the MNO.

Clause 48: The computer-readable storage medium of clause 43, further comprising instructions that cause the processor to receive, from the server device executing the AF, data representing at least one of a Traversal Using Relay Network Address Translation (TURN) server or a Session Traversal of UDP (STUN) server.

Clause 49: The computer-readable storage medium of clause 43, wherein the data representing the QoS flows associated with the one or more of the valid ICE candidates includes data representing associations between QoS flow descriptions and QoS specifications.

Clause 50: The computer-readable storage medium of clause 43, wherein the data representing the QoS flows associated with the one or more of the valid ICE candidates includes data describing a service data flow for which QoS is provided.

Clause 51: The computer-readable storage medium of clause 43, wherein the data representing the QoS flows associated with the one or more of the valid ICE candidates includes a reference to the QoS specification.

Clause 52: The computer-readable storage medium of clause 43, further comprising instructions that cause the processor to send an update message to the server device executing the AF including data associating one of the valid ICE candidates with one of the QoS flows.

Clause 53: The computer-readable storage medium of clause 43, wherein the media communication session comprises a Web Real-Time Communication (WebRTC) communication session.

Clause 54: A first client device for applying quality of service to a media communication session, the first client device comprising: means for determining a list of interactive connectivity establishment (ICE) candidates for a second client device; means for determining valid ICE candidates in the list of ICE candidates; means for sending, for one or more of the valid ICE candidates, data representing quality of service (QoS) flows associated with the one or more of the valid ICE candidates to a server device executing an application function (AF), the AF providing media control for the media communication session; means for determining one of the valid ICE candidates and one of the QoS flows associated with the one of the valid ICE candidates; means for establishing the media communication session with the second client device using the determined one of the valid ICE candidates; means for determining an association between a QoS specification and the one of the QoS flows for the media communication session; and means for providing data to the AF to apply QoS to the media communication session according to the QoS specification.

Clause 55: A method of applying quality of service to a media communication session, the method comprising: determining, by a first client device, a list of interactive connectivity establishment (ICE) candidates for a second client device; determining, by the first client device, valid ICE candidates in the list of ICE candidates; for one or more of the valid ICE candidates, sending, by the first client device, data representing quality of service (QoS) flows associated with the one or more of the valid ICE candidates to a server device executing an application function (AF), the AF providing media control for the media communication session; determining, by the first client device, one of the valid ICE candidates and one of the QoS flows associated with the one of the valid ICE candidates; establishing, by the first client device, the media communication session with the second client device using the determined one of the valid ICE candidates; determining, by the first client device, an association between a QoS specification and the one of the QoS flows for the media communication session; and providing, by the first client device, data to the AF to apply QoS to the media communication session according to the QoS specification.

Clause 56: The method of clause 55, wherein determining the list of ICE candidates comprises: receiving data defining a plurality of ICE candidates; and forming the list of ICE candidates to include one or more of the plurality of ICE candidates.

Clause 57: The method of any of clauses 55 and 56, wherein the first client device is communicatively coupled to a first mobile network operator (MNO), the second client device is communicatively coupled to a second MNO, and providing the data to the application function to apply QoS to the media communication session comprises invoking QoS provided by the first MNO using a service based architecture (SBA) procedure offered by the first MNO.

Clause 58: The method of any of clauses 55 and 56, wherein the first client device is communicatively coupled to a first mobile network operator (MNO), the second client device is communicatively coupled to a second MNO, and determining the list of ICE candidates comprises receiving data representing one or more of the ICE candidates from the first MNO.

Clause 59: The method of any of clauses 55 and 56, wherein the first client device is communicatively coupled to a mobile network operator (MNO) and the second client device is communicatively coupled to the MNO.

Clause 60: The method of any of clauses 55-59, further comprising receiving, from the server device executing the AF, data representing at least one of a Traversal Using Relay Network Address Translation (TURN) server or a Session Traversal of UDP (STUN) server.

Clause 61: The method of any of clauses 55-60, wherein the data representing the QoS flows associated with the one or more of the valid ICE candidates includes data representing associations between QoS flow descriptions and QoS specifications.

Clause 62: The method of any of clauses 55-61, wherein the data representing the QoS flows associated with the one or more of the valid ICE candidates includes data describing a service data flow for which QoS is provided.

Clause 63: The method of any of clauses 55-62, wherein the data representing the QoS flows associated with the one or more of the valid ICE candidates includes a reference to the QoS specification.

Clause 64: The method of any of clauses 55-63, further comprising sending an update message to the server device executing the AF including data associating one of the valid ICE candidates with one of the QoS flows.

Clause 65: The method of any of clauses 55-64, wherein the media communication session comprises a Web Real-Time Communication (WebRTC) communication session.

Clause 66: A first client device for applying quality of service to a media communication session, the first client device comprising: a memory configured to store media data; and one or more processors implemented in circuitry and configured to: determine a list of interactive connectivity establishment (ICE) candidates for a second client device; determine valid ICE candidates in the list of ICE candidates; for one or more of the valid ICE candidates, send data representing quality of service (QoS) flows associated with the one or more of the valid ICE candidates to a server device executing an application function (AF), the AF providing media control for the media communication session; determine one of the valid ICE candidates and one of the QoS flows associated with the one of the valid ICE candidates; establish the media communication session with the second client device using the determined one of the valid ICE candidates; determine an association between a QoS specification and the one of the QoS flows for the media communication session; and provide data to the AF to apply QoS to the media communication session according to the QoS specification.

Clause 67: The first client device of clause 66, wherein to determine the list of ICE candidates, the one or more processors are configured to: receive data defining a plurality of ICE candidates; and form the list of ICE candidates to include one or more of the plurality of ICE candidates.

Clause 68: The first client device of any of clauses 66 and 67, wherein the first client device is communicatively coupled to a first mobile network operator (MNO), the second client device is communicatively coupled to a second MNO, and to provide the data to the application function to apply QoS to the media communication session, the one or more processors are configured to invoke QoS provided by the first MNO using a service based architecture (SBA) procedure offered by the first MNO.

Clause 69: The first client device of any of clauses 66 and 67, wherein the first client device is communicatively coupled to a first mobile network operator (MNO), the second client device is communicatively coupled to a second MNO, and to determine the list of ICE candidates, the one or more processors are configured to receive data representing one or more of the ICE candidates from the first MNO.

Clause 70: The first client device of any of clauses 66 and 67, wherein the first client device is communicatively coupled to a mobile network operator (MNO) and the second client device is communicatively coupled to the MNO.

Clause 71: The first client device of any of clauses 66-70, wherein the one or more processors are further configured to receive, from the server device executing the AF, data representing at least one of a Traversal Using Relay Network Address Translation (TURN) server or a Session Traversal of UDP (STUN) server.

Clause 72: The first client device of any of clauses 66-71, wherein the data representing the QoS flows associated with the one or more of the valid ICE candidates includes data representing associations between QoS flow descriptions and QoS specifications.

Clause 73: The first client device of any of clauses 66-72, wherein the data representing the QoS flows associated with the one or more of the valid ICE candidates includes data describing a service data flow for which QoS is provided.

Clause 74: The first client device of any of clauses 66-73, wherein the data representing the QoS flows associated with the one or more of the valid ICE candidates includes a reference to the QoS specification.

Clause 75: The first client device of any of clauses 66-74, wherein the one or more processors are further configured to send an update message to the server device executing the AF including data associating one of the valid ICE candidates with one of the QoS flows.

Clause 76: The first client device of any of clauses 66-75, wherein the media communication session comprises a Web Real-Time Communication (WebRTC) communication session.

Clause 77: The first client device of any of clauses 66-76, further comprising a display.

Clause 78: The first client device of any of clauses 66-77, wherein the first client device comprises one or more of a camera, a computer, a mobile device, a broadcast receiver device, or a set-top box.

Clause 79: A computer-readable storage medium having stored thereon instructions that, when executed, cause a processor of a first client device to: determine a list of interactive connectivity establishment (ICE) candidates for a second client device; determine valid ICE candidates in the list of ICE candidates; for one or more of the valid ICE candidates, send data representing quality of service (QoS) flows associated with the one or more of the valid ICE candidates to a server device executing an application function (AF), the AF providing media control for the media communication session; determine one of the valid ICE candidates and one of the QoS flows associated with the one of the valid ICE candidates; establish the media communication session with the second client device using the determined one of the valid ICE candidates; determine an association between a QoS specification and the one of the QoS flows for the media communication session; and provide data to the AF to apply QoS to the media communication session according to the QoS specification.

Clause 80: The computer-readable storage medium of clause 79, wherein the instructions that cause the processor to determine the list of ICE candidates comprise instructions that cause the processor to: receive data defining a plurality of ICE candidates; and form the list of ICE candidates to include one or more of the plurality of ICE candidates.

Clause 81: The computer-readable storage medium of any of clauses 79 and 80, wherein the first client device is communicatively coupled to a first mobile network operator (MNO), the second client device is communicatively coupled to a second MNO, and the instructions that cause the processor to provide the data to the application function to apply QoS to the media communication session comprise instructions that cause the processor to invoke QoS provided by the first MNO using a service based architecture (SBA) procedure offered by the first MNO.

Clause 82: The computer-readable storage medium of any of clauses 79 and 80, wherein the first client device is communicatively coupled to a first mobile network operator (MNO), the second client device is communicatively coupled to a second MNO, and the instructions that cause the processor to determine the list of ICE candidates comprise instructions that cause the processor to receive data representing one or more of the ICE candidates from the first MNO.

Clause 83: The computer-readable storage medium of any of clauses 79 and 80, wherein the first client device is communicatively coupled to a mobile network operator (MNO) and the second client device is communicatively coupled to the MNO.

Clause 84: The computer-readable storage medium of any of clauses 79-83, further comprising instructions that cause the processor to receive, from the server device executing the AF, data representing at least one of a Traversal Using Relay Network Address Translation (TURN) server or a Session Traversal of UDP (STUN) server.

Clause 85: The computer-readable storage medium of any of clauses 79-84, wherein the data representing the QoS flows associated with the one or more of the valid ICE candidates includes data representing associations between QoS flow descriptions and QoS specifications.

Clause 86: The computer-readable storage medium of any of clauses 79-85, wherein the data representing the QoS flows associated with the one or more of the valid ICE candidates includes data describing a service data flow for which QoS is provided.

Clause 87: The computer-readable storage medium of any of clauses 79-86, wherein the data representing the QoS flows associated with the one or more of the valid ICE candidates includes a reference to the QoS specification.

Clause 88: The computer-readable storage medium of any of clauses 79-87, further comprising instructions that cause the processor to send an update message to the server device executing the AF including data associating one of the valid ICE candidates with one of the QoS flows.

Clause 89: The computer-readable storage medium of any of clauses 79-88, wherein the media communication session comprises a Web Real-Time Communication (WebRTC) communication session.

Clause 90: A first client device for applying quality of service to a media communication session, the first client device comprising: means for determining a list of interactive connectivity establishment (ICE) candidates for a second client device; means for determining valid ICE candidates in the list of ICE candidates; means for sending, for one or more of the valid ICE candidates, data representing quality of service (QoS) flows associated with the one or more of the valid ICE candidates to a server device executing an application function (AF), the AF providing media control for the media communication session; means for determining one of the valid ICE candidates and one of the QoS flows associated with the one of the valid ICE candidates; means for establishing the media communication session with the second client device using the determined one of the valid ICE candidates; means for determining an association between a QoS specification and the one of the QoS flows for the media communication session; and means for providing data to the AF to apply QoS to the media communication session according to the QoS specification.

Clause 91: The first client device of clause 90, wherein the means for determining the list of ICE candidates comprises: means for receiving data defining a plurality of ICE candidates; and means for forming the list of ICE candidates to include one or more of the plurality of ICE candidates.

Clause 92: The first client device of any of clauses 90 and 91, wherein the first client device is communicatively coupled to a first mobile network operator (MNO), the second client device is communicatively coupled to a second MNO, and the means for providing the data to the application function to apply QoS to the media communication session comprises means for invoking QoS provided by the first MNO using a service based architecture (SBA) procedure offered by the first MNO.

Clause 93: The first client device of any of clauses 90 and 91, wherein the first client device is communicatively coupled to a first mobile network operator (MNO), the second client device is communicatively coupled to a second MNO, and the means for determining the list of ICE candidates comprises means for receiving data representing one or more of the ICE candidates from the first MNO.

Clause 94: The first client device of any of clauses 90 and 91, wherein the first client device is communicatively coupled to a mobile network operator (MNO) and the second client device is communicatively coupled to the MNO.

Clause 95: The first client device of any of clauses 90-94, further comprising means for receiving, from the server device executing the AF, data representing at least one of a Traversal Using Relay Network Address Translation (TURN) server or a Session Traversal of UDP (STUN) server.

Clause 96: The first client device of any of clauses 90-95, wherein the data representing the QoS flows associated with the one or more of the valid ICE candidates includes data representing associations between QoS flow descriptions and QoS specifications.

Clause 97: The first client device of any of clauses 90-96, wherein the data representing the QoS flows associated with the one or more of the valid ICE candidates includes data describing a service data flow for which QoS is provided.

Clause 98: The first client device of any of clauses 90-97, wherein the data representing the QoS flows associated with the one or more of the valid ICE candidates includes a reference to the QoS specification.

Clause 99: The first client device of any of clauses 90-98, further comprising means for sending an update message to the server device executing the AF including data associating one of the valid ICE candidates with one of the QoS flows.

Clause 100: The first client device of any of clauses 90-99, wherein the media communication session comprises a Web Real-Time Communication (WebRTC) communication session.

Clause 101: A method of applying quality of service to a media communication session, the method comprising: receiving, from a first client device and by a server device executing an application function (AF), data representing quality of service (QoS) flows associated with one or more valid interactive connectivity establishment (ICE) candidates for the first client device, the AF providing media control for a media communication session between the first client device and a second client device; receiving, from the first client device and by the server device, data representing an association between one of the QoS flows and an associated QoS specification; and applying, by the server device, QoS to the media communication session according to the QoS specification corresponding to the one of the QoS flows.

Clause 102: A server device for applying quality of service to a media communication session, the device comprising: a memory configured to store associations between quality of service (QoS) flows and one or more valid interactive connectivity establishment (ICE) candidates for a first client device; and one or more processors implemented in circuitry and configured to: execute an application function (AF), the AF providing media control for a media communication session between the first client device and a second client device; receive, from the first client device, data representing the associations between QoS flows and the one or more valid ICE candidates for the first client device; receive, from the first client device, data representing an association between one of the QoS flows and an associated QoS specification; and apply, by the server device, QoS to the media communication session according to the QoS specification corresponding to the one of the QoS flows.

Clause 103: A computer-readable storage medium having stored thereon instructions that cause a processor of a server device to: executing an application function (AF), the AF providing media control for a media communication session between a first client device and a second client device; receive, from the first client device, data representing quality of service (QoS) flows associated with one or more valid interactive connectivity establishment (ICE) candidates for the first client device; receive, from the first client device, data representing an association between one of the QoS flows and an associated QoS specification; and apply QoS to the media communication session according to the QoS specification corresponding to the one of the QoS flows.

Clause 104: A server device for applying quality of service to a media communication session, the server device comprising: means for executing an application function (AF), the AF providing media control for a media communication session between a first client device and a second client device; means for receiving, from the first client device, data representing quality of service (QoS) flows associated with one or more valid interactive connectivity establishment (ICE) candidates for the first client device; means for receiving, from the first client device, data representing an association between one of the QoS flows and an associated QoS specification; and means for applying QoS to the media communication session according to the QoS specification corresponding to the one of the QoS flows.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of applying quality of service to a media communication session, the method comprising:
   determining, by a first client device, a list of interactive connectivity establishment (ICE) candidates for a second client device;
   determining, by the first client device, valid ICE candidates in the list of ICE candidates for the second client device;
   for one or more of the valid ICE candidates, sending, by the first client device, data representing quality of service (QoS) flows associated with the one or more of the valid ICE candidates to a server device executing an application function (AF), the AF providing media control for the media communication session;
   determining, by the first client device, one of the valid ICE candidates and one of the QoS flows associated with the one of the valid ICE candidates;
   establishing, by the first client device, the media communication session with the second client device using the determined one of the valid ICE candidates;
   determining, by the first client device, an association between a QoS specification and the one of the QoS flows for the media communication session; and
   providing, by the first client device, data to the AF to apply QoS to the media communication session according to the QoS specification,
   wherein the first client device is communicatively coupled to a first mobile network operator (MNO) and providing the data to the AF to apply QoS to the media communication session comprises invoking QoS provided by the first MNO using a service based architecture (SBA) procedure offered by the first MNO.

2. The method of claim 1, wherein the second client device is communicatively coupled to a second MNO, and determining the list of ICE candidates comprises receiving data representing one or more of the ICE candidates from the first MNO.

3. The method of claim 1, wherein the second client device is communicatively coupled to the first MNO.

4. The method of claim 1, further comprising receiving, from the server device executing the AF, data representative of at least one of a Traversal Using Relay Network Address Translation (TURN) server or a Session Traversal of UDP (STUN) server.

5. The method of claim 1, wherein the data representing the QoS flows associated with the one or more of the valid ICE candidates includes data representing associations between QoS flow descriptions and QoS specifications.

6. The method of claim 1, wherein the data representing the QoS flows associated with the one or more of the valid ICE candidates includes data describing a service data flow for which QoS is provided.

7. The method of claim 1, wherein the data representing the QoS flows associated with the one or more of the valid ICE candidates includes a reference to the QoS specification.

8. The method of claim 1, further comprising sending an update message to the server device executing the AF including data associating one of the valid ICE candidates with one of the QoS flows.

9. The method of claim 1, wherein the media communication session comprises a Web Real-Time Communication (WebRTC) communication session.

10. A first client device for applying quality of service to a media communication session, the first client device comprising:
    a memory configured to store media data; and
    one or more processors implemented in circuitry and configured to:
        determine a list of interactive connectivity establishment (ICE) candidates for a second client device;
        determine valid ICE candidates in the list of ICE candidates;
        for one or more of the valid ICE candidates, send data representing quality of service (QoS) flows associated with the one or more of the valid ICE candidates to a server device executing an application function (AF), the AF providing media control for the media communication session;
        determine one of the valid ICE candidates and one of the QoS flows associated with the one of the valid ICE candidates;
        establish the media communication session with the second client device using the determined one of the valid ICE candidates;
        determine an association between a QoS specification and the one of the QoS flows for the media communication session; and
        provide data to the AF to apply QoS to the media communication session according to the QoS specification, wherein the first client device is communicatively coupled to a first mobile network operator (MNO) and to provide data to the AF to apply QoS to the media communication session, the one or more processors are configured to invoke QoS provided by the first MNO using a service based architecture (SBA) procedure offered by the first MNO.

11. The first client device of claim 10, wherein the second client device is communicatively coupled to a second MNO, and to determine the list of ICE candidates, the one or more processors are configured to receive data representing one or more of the ICE candidates from the first MNO.

12. The first client device of claim 10, wherein the second client device is communicatively coupled to the first MNO.

13. The first client device of claim 10, wherein the one or more processors are further configured to receive, from the server device executing the AF, data representative of at least one of a Traversal Using Relay Network Address Translation (TURN) server or a Session Traversal of UDP (STUN) server.

14. The first client device of claim 10, wherein the data representing the QoS flows associated with the one or more of the valid ICE candidates includes data representing associations between QoS flow descriptions and QoS specifications.

15. The first client device of claim 10, wherein the data representing the QoS flows associated with the one or more of the valid ICE candidates includes data describing a service data flow for which QoS is provided.

16. The first client device of claim 10, wherein the data representing the QoS flows associated with the one or more of the valid ICE candidates includes a reference to the QoS specification.

17. The first client device of claim 10, wherein the one or more processors are further configured to send an update message to the server device executing the AF including data associating one of the valid ICE candidates with one of the QoS flows.

18. The first client device of claim 10, wherein the media communication session comprises a Web Real-Time Communication (WebRTC) communication session.

19. The first client device of claim 10, further comprising a display.

20. The first client device of claim 10, wherein the first client device comprises one or more of a camera, a computer, a mobile device, a broadcast receiver device, or a set-top box.

21. A computer-readable storage medium having stored thereon instructions that, when executed, cause a processor of a first client device to:
- determine a list of interactive connectivity establishment (ICE) candidates for a second client device;
- determine valid ICE candidates in the list of ICE candidates;
- for one or more of the valid ICE candidates, send data representing quality of service (QoS) flows associated with the one or more of the valid ICE candidates to a server device executing an application function (AF), the AF providing media control for the media communication session;
- determine one of the valid ICE candidates and one of the QoS flows associated with the one of the valid ICE candidates;
- establish the media communication session with the second client device using the determined one of the valid ICE candidates;
- determine an association between a QoS specification and the one of the QoS flows for the media communication session; and
- provide data to the AF to apply QoS to the media communication session according to the QoS specification, wherein the first client device is communicatively coupled to a first mobile network operator (MNO) and the instructions that cause the processor to provide data to the AF to apply QoS to the media communication session comprise instructions that cause the processor to invoke QoS provided by the first MNO using a service based architecture (SBA) procedure offered by the first MNO.

22. The computer-readable storage medium of claim 21, wherein the second client device is communicatively coupled to a second MNO, and the instructions that cause the processor to determine the list of ICE candidates comprise instructions that cause the processor to receive data representing one or more of the ICE candidates from the first MNO.

23. The computer-readable storage medium of claim 21, wherein second client device is communicatively coupled to the first MNO.

24. The computer-readable storage medium of claim 21, further comprising instructions that cause the processor to receive, from the server device executing the AF, data representative of at least one of a Traversal Using Relay Network Address Translation (TURN) server or a Session Traversal of UDP (STUN) server.

25. The computer-readable storage medium of claim 21, wherein the data representing the QoS flows associated with the one or more of the valid ICE candidates includes data representing associations between QoS flow descriptions and QoS specifications.

26. The computer-readable storage medium of claim 21, wherein the data representing the QoS flows associated with the one or more of the valid ICE candidates includes data describing a service data flow for which QoS is provided.

27. The computer-readable storage medium of claim 21, wherein the data representing the QoS flows associated with the one or more of the valid ICE candidates includes a reference to the QoS specification.

28. The computer-readable storage medium of claim 21, further comprising instructions that cause the processor to send an update message to the server device executing the AF including data associating one of the valid ICE candidates with one of the QoS flows.

29. The computer-readable storage medium of claim 21, wherein the media communication session comprises a Web Real-Time Communication (WebRTC) communication session.

30. A first client device for applying quality of service to a media communication session, the first client device comprising:
- means for determining a list of interactive connectivity establishment (ICE) candidates for a second client device;
- means for determining valid ICE candidates in the list of ICE candidates;
- means for sending, for one or more of the valid ICE candidates, data representing quality of service (QoS) flows associated with the one or more of the valid ICE candidates to a server device executing an application function (AF), the AF providing media control for the media communication session;
- means for determining one of the valid ICE candidates and one of the QoS flows associated with the one of the valid ICE candidates;
- means for establishing the media communication session with the second client device using the determined one of the valid ICE candidates;
- means for determining an association between a QoS specification and the one of the QoS flows for the media communication session; and
- means for providing data to the AF to apply QoS to the media communication session according to the QoS specification, wherein the first client device is communicatively coupled to a first mobile network operator (MNO) and the means for providing the data to the AF to apply QoS to the media communication session comprises means for invoking QoS provided by the first MNO using a service based architecture (SBA) procedure offered by the first MNO.

31. The first client device of claim 30, wherein the second client device is communicatively coupled to a second MNO and wherein the means for determining the list of ICE candidates comprises means for receiving data representing one or more of the ICE candidates from the first MNO.

32. The first client device of claim 30, wherein the second client device is communicatively coupled to the first MNO.

33. The first client device of claim 30, further comprising means for receiving, from the server device executing the AF, data representative of at least one of a Traversal Using Relay Network Address Translation (TURN) server or a Session Traversal of UDP (STUN) server.

34. The first client device of claim 30, wherein the data representing the QoS flows associated with the one or more of the valid ICE candidates includes data representing associations between QoS flow descriptions and QoS specifications.

35. The first client device of claim 30, wherein the data representing the QoS flows associated with the one or more of the valid ICE candidates includes data describing a service data flow for which QoS is provided.

36. The first client device of claim 30, wherein the data representing the QoS flows associated with the one or more of the valid ICE candidates includes a reference to the QoS specification.

37. The first client device of claim 30, further comprising means for sending an update message to the server device executing the AF including data associating one of the valid ICE candidates with one of the QoS flows.

38. The first client device of claim 30, wherein the media communication session comprises a Web Real-Time Communication (WebRTC) communication session.

* * * * *